(12) United States Patent
Ozaki

(10) Patent No.: US 7,970,508 B2
(45) Date of Patent: Jun. 28, 2011

(54) GUIDED TRAVEL CONTROL METHOD AND CONTROL APPARATUS FOR UNMANNED VEHICLE

(75) Inventor: Tomonori Ozaki, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 904 days.

(21) Appl. No.: 11/982,769

(22) Filed: Nov. 5, 2007

(65) Prior Publication Data

US 2008/0109127 A1    May 8, 2008

(30) Foreign Application Priority Data

Nov. 7, 2006  (JP) .................................. 2006-301506

(51) Int. Cl.
*G01C 22/00* (2006.01)
(52) U.S. Cl. .............. 701/24; 701/23; 701/26; 701/207; 701/209; 701/210; 701/211; 180/168; 340/988
(58) Field of Classification Search .................... 701/23, 701/24, 25, 26, 207–212; 180/167, 168, 180/169; 318/567, 568.1, 580; 340/988, 340/995.25
See application file for complete search history.

(56) References Cited

U.S. PATENT DOCUMENTS

| 6,502,016 B1 * | 12/2002 | Ozaki et al. ..................... 701/23 |
| 6,539,294 B1 * | 3/2003 | Kageyama ....................... 701/23 |
| 7,742,853 B2 * | 6/2010 | Mori et al. ...................... 701/24 |

FOREIGN PATENT DOCUMENTS

| JP | 2000-137522 | 5/2000 |
| WO | WO 98/37468 | 8/1998 |

* cited by examiner

*Primary Examiner* — Gertrude Arthur Jeanglaud
(74) *Attorney, Agent, or Firm* — Husch Blackwell LLP

(57) ABSTRACT

The guided travel control method and guided travel control apparatus capable of creating a traveling course by teaching only target earth unloading points, without traveling through all passage points of the traveling course, prior to the guided traveling, when each traveling course to each target earth unloading point is taught, thereby increasing the efficiency of teaching operation and also increasing the operation efficiency. In the invention, a corrected traveling course for guiding an unmanned vehicle is created based on a hopper detour area, a corrected target earth unloading position, and a target movement direction in a target earth unloading position such that the unmanned vehicle moves in the target movement direction to the corrected target earth unloading position without interfering with the hopper detour area, then the unmanned vehicle is guided to travel along the created corrected traveling course.

13 Claims, 18 Drawing Sheets

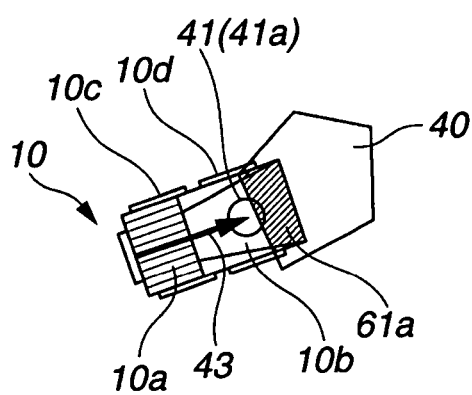
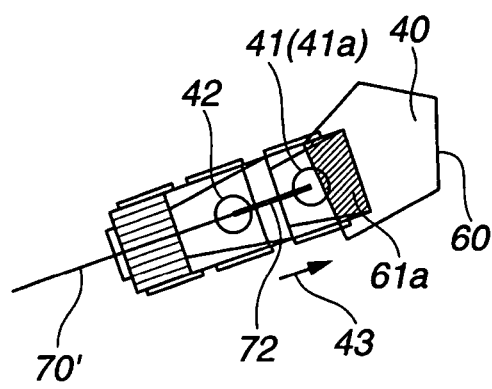
FIG.2A  FIG.2B

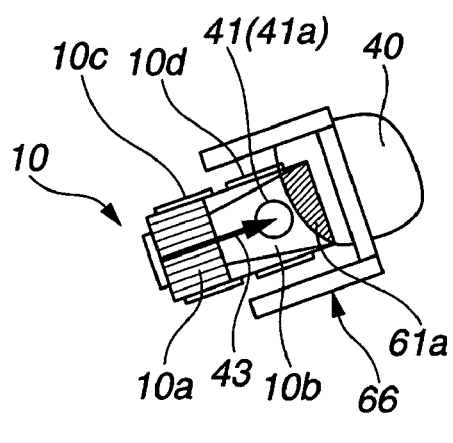
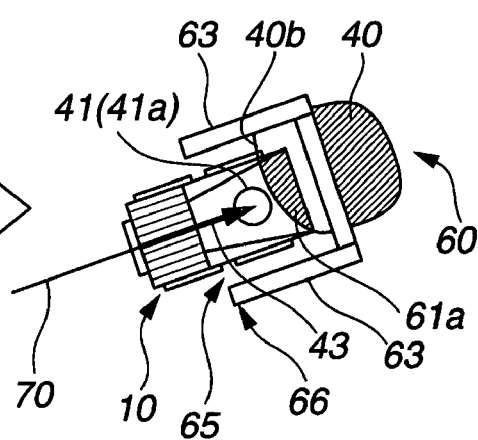
FIG.3A  FIG.3B

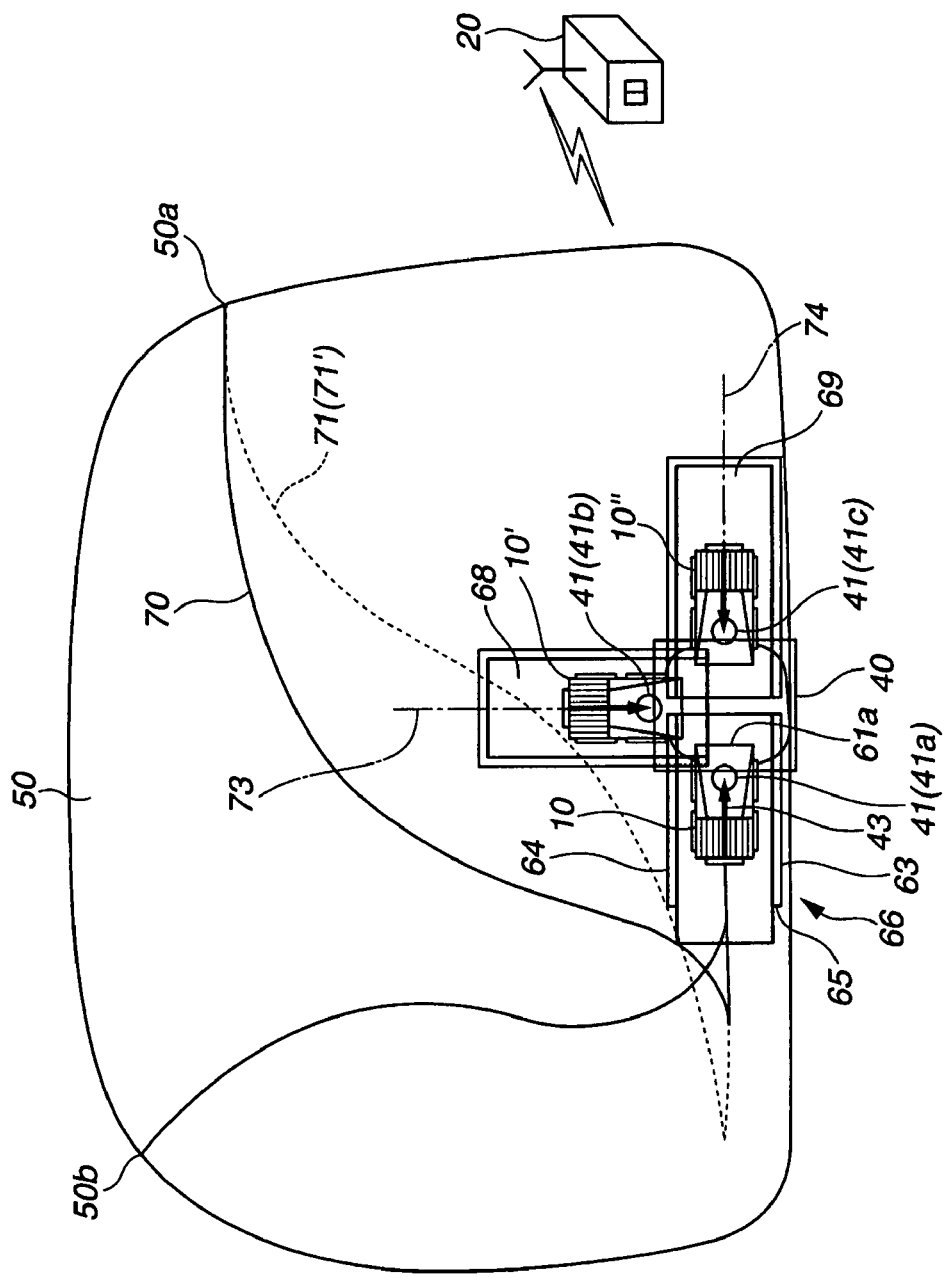
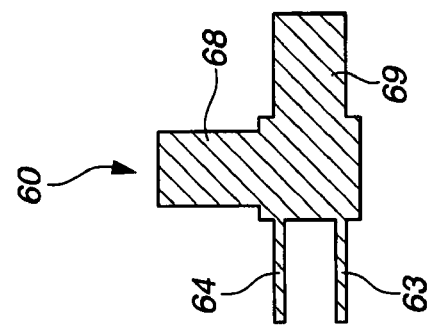
FIG.5A
FIG.5B

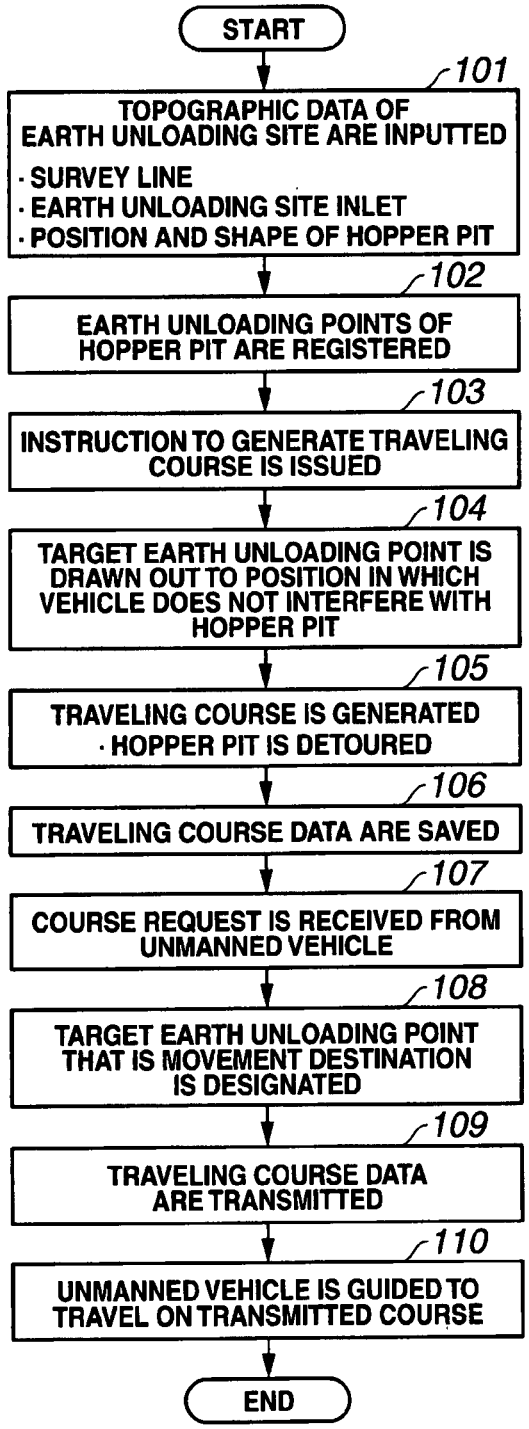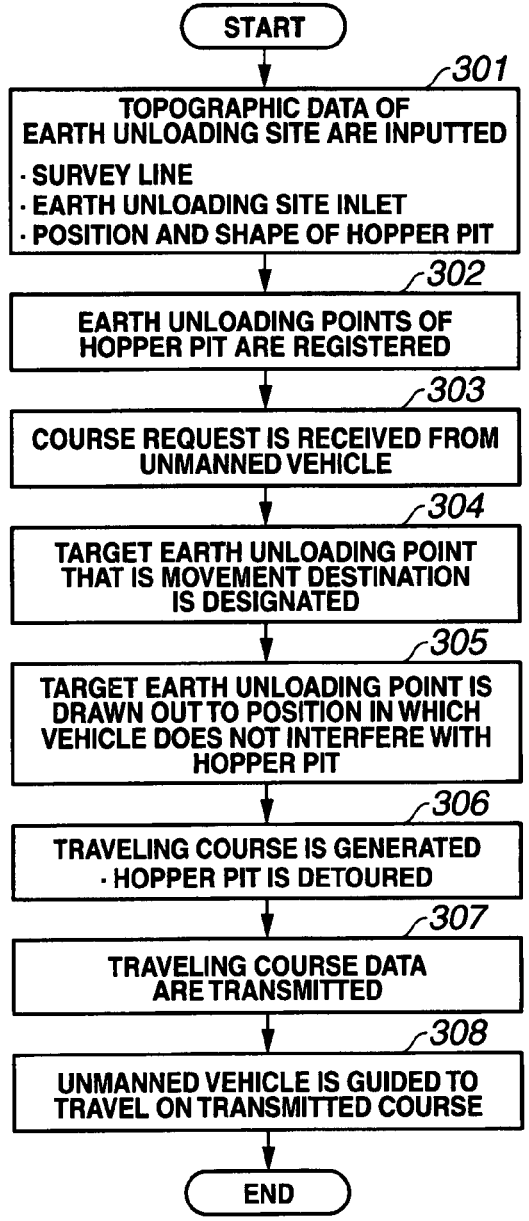
FIG.8A
FIG.8B

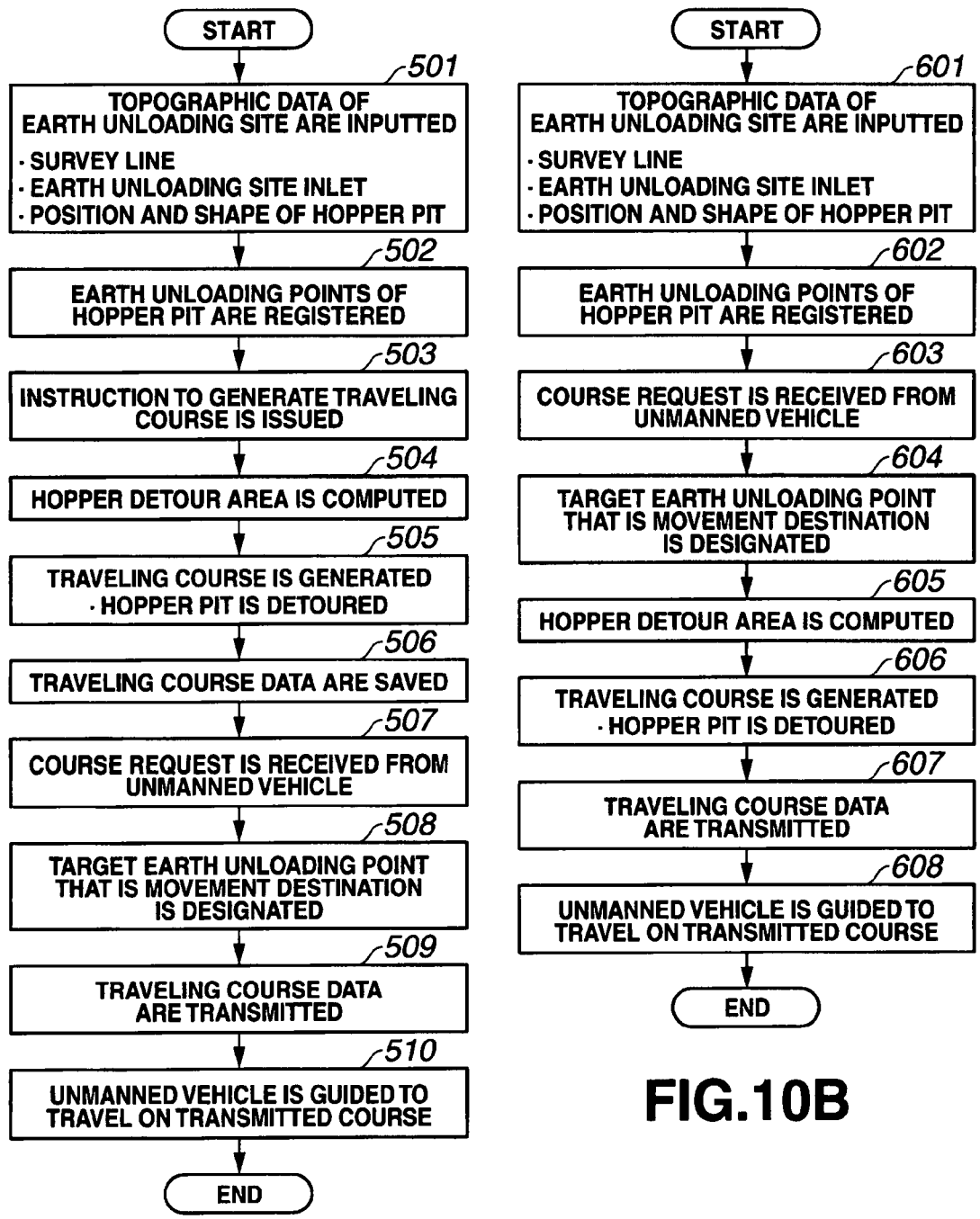

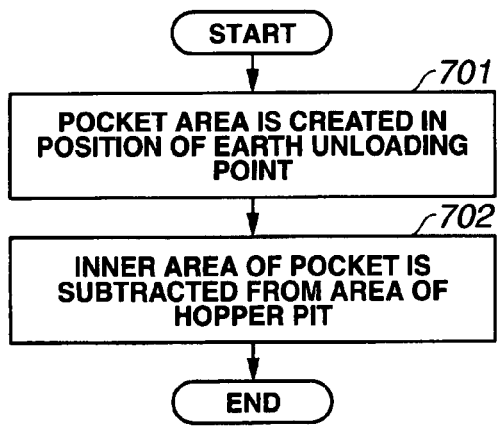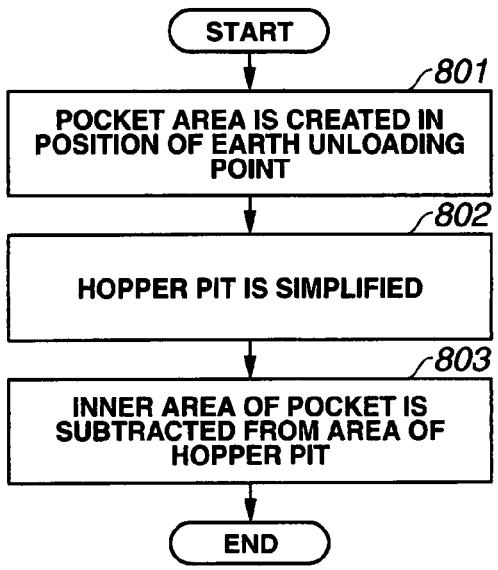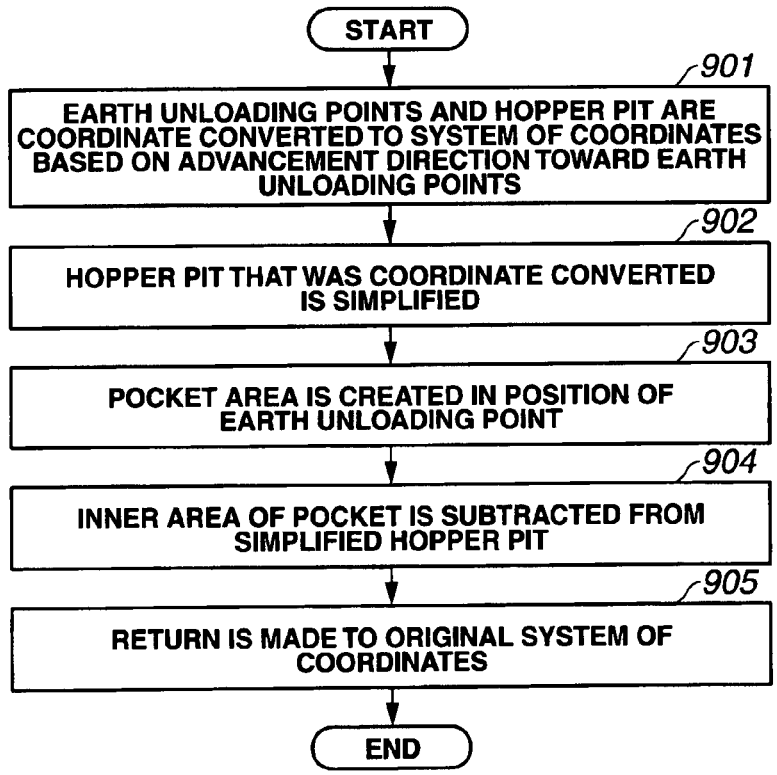

GUIDED TRAVEL CONTROL METHOD AND CONTROL APPARATUS FOR UNMANNED VEHICLE

BACKGROUND OF THE INVENTION

1. Field of the Invention

The present invention relates to a guided travel control apparatus for an unmanned vehicle, and more particularly to a control method and control apparatus to be applied when an unmanned vehicle such as a dump truck is guided to travel to a hopper pit and an earth unloading operation is performed.

2. Description of the Related Art

At operation sites of large-scale mines, an earth unloading operation is performed in which earth is loaded onto an unmanned vehicle such as a dump truck, transported to a hopper pit, and unloaded into the hopper pit. The unmanned vehicle is guided to travel along a traveling course that was taught in advance.

The operation of earth unloading to a hopper pit is performed, as shown in FIG. 1, by rearing vehicles 10 till the rear wheels thereof touch a wheel stopper at the edge of a hopper pit 40 and setting load-carrying platforms (vessels, bodies) 13$b$ so that they interfere with the area of the hopper 40 (load-carrying platforms 13$b$ are positioned above the hopper pit 40). This is done to prevent the earth from scattering around the hopper pit 40 when the load-carrying platforms 13$b$ are tilted and the earth is unloaded.

Therefore, the guided travel has to be preformed with good accuracy so that earth drops reliably onto the hopper pit 40 and that the unmanned vehicle 10 does not get into the hopper pit 40 or get stuck therein during guided travel.

Conventional Technology 1

A teaching method has been conventionally employed by which a traveling course 79 from a start point till an earth unloading point 41 of the hopper pit 40 is actually run prior to the guided travel and positions of various passage points on the traveling course 79 and data relating to advancement direction are acquired as teaching data.

Conventional Technology 2

Japanese Patent Application Laid-open No. 2000-137522 describes an invention according to which position data of a survey line are acquired with an operator-driven vehicle actually traveling along the survey line of an earth unloading site prior to the guided traveling, and teaching data for each traveling course to each target earth unloading point along the survey line are found by computations based on the position data of the survey line.

Conventional Technology 3

International Patent Application WO98/37468 describes an invention according to which when a plurality of unmanned vehicles are guided to travel and there is a risk of interference between a leading unmanned vehicle and a following unmanned vehicle, the following unmanned vehicle waits till the leading unmanned vehicle departs in a position in which the following unmanned vehicle does not interfere with the leading unmanned vehicle, and then the following unmanned vehicle passes through a location where the leading unmanned vehicle was located.

As shown in FIG. 1, a plurality of earth unloading points 41$a$, 41$b$, 41$c$ . . . are set around the same hopper pit 40. Further, a plurality of hopper pits 40 are provided in a large-scale operation site. Therefore, with the method of Conventional Technology 1 by which teaching data are acquired by actually traveling along each traveling course till each target earth unloading point is reached, the teaching operation requires significant time, efforts, and skills and greatly decreases the operation efficiency.

Further, due to control errors in guided traveling control (computation processing) and errors caused by slip or the like, a shift occurs between the teaching data relating to the traveling course that was determined in advance and the actual travel trajectory of the unmanned vehicle 10 along the traveling course. In particular, in a location where the unmanned vehicle 10 makes a sharp turn, maximum steering is made during traveling course teaching and teaching data for a minimum turn radius are acquired, thereby making it impossible to correct the aforementioned shift. As a result, the unmanned vehicle 10 gets off the course, cannot continue traveling, and interferes with the hopper pit 40 during traveling, thereby creating a risk of a wheel coming off the unmanned vehicle 10 or the vehicle being stuck in the pit.

Further, in order to increase operation efficiency, as shown in FIG. 1, a plurality of unmanned vehicles 10, 10', 10" have to be guided almost simultaneously to travel to the same hopper pit 40 and the earth unloading operation has to be performed almost simultaneously in each earth unloading point 41$a$, 41$b$, 41$c$ . . . .

However, in many cases (see FIG. 1), a traveling course 79 leading to a certain earth unloading point (for example, the earth unloading point 41$a$) in the vicinity of a hopper pit 40 is unavoidably set close to other earth unloading point (for example, the earth unloading point 41$b$). Here, when a plurality of unmanned vehicles 10, 10', 10" . . . are guided to travel simultaneously, traveling control such that causes an unmanned vehicle that comes close to other vehicle to pass this vehicle or to wait for this other vehicle to pass by is usually conducted in order to avoid interference between the unmanned vehicles. However, if one unmanned vehicle passes other unmanned vehicle in the vicinity of the hopper pit 40, the actual traveling trajectory shifts significantly with respect to the preset traveling course and the target earth unloading point 41$a$ of the hopper pit 40 cannot be accurately reached. Further, where one vehicle waits (stands by) in the vicinity of the hopper pit 40 till the other unmanned vehicle completes the earth unloading operation, the operation efficiency is greatly degraded.

There is also a technology for setting an interference prohibition area in which interference between unmanned vehicles is prohibited and traveling control is performed to prevent the interference of unmanned vehicles in the interference prohibition area (referred to as interference prohibition area avoidance control).

Where such technology of interference prohibition area avoidance control is applied to guided traveling to the hopper pit, the area indicating the hopper pit 40 is set as the interference prohibition area to prevent the unmanned vehicle 10 from interfering with the hopper pit 40 during traveling. However, as described above, in the earth unloading point that is a target ground point of the traveling course, the unmanned vehicle 10 has to be in a state in which part of the vehicle interferes with the area of the hopper pit 40 (load-carrying platform 13$b$ is positioned above the hopper pit 40). As a consequence, if the interference area avoidance control is applied as is, interference of the unmanned vehicle 10 with the hopper pit 40 will be prohibited and the unmanned vehicle 10 will not reach the target earth unloading point. Therefore, the unmanned vehicle 10 has to be caused "to interfere in the interference prohibition area" in the earth unloading point by another method that contradicts the interference area avoidance control. However, presently there is no well-known technology for performing such control.

SUMMARY OF THE INVENTION

The present invention was conceived with the foregoing in view and it is an object of the present invention to enable the creation of a traveling course by teaching only the target earth unloading points, without traveling through all the passage points of the traveling course, prior to the guided traveling, when each traveling course to each target earth unloading point is taught, thereby increasing the efficiency of teaching operation and also increasing the operation efficiency. In addition, it is an object of the present invention to enable the unmanned vehicles to reach the target earth unloading points of a hopper pit with good accuracy, without interfering with the hopper pit during traveling. Yet another object of the present invention is to enable an unmanned vehicle to reach the target earth unloading point with good accuracy and without a waiting time, while reliably preventing interference with other unmanned vehicle in the vicinity of hopper pit when a plurality of unmanned vehicles are guided to travel almost simultaneously to the same hopper pit or when an unmanned vehicle is guided to travel to the same hopper pit as other unmanned vehicle performs an earth unloading operation at this hopper pit.

Further, Conventional Technology 2 merely discloses a computation method for computing traveling courses to each earth unloading point along a survey line from position data of the survey line, whereas this technology is completely different from the technology of the present invention that is aimed at finding each traveling course leading to each earth unloading point around the hopper pit, and the computation method of Conventional Technology 2 cannot be applied as is to attain the objects of the present invention.

The first invention provides:

a guided travel control method for an unmanned vehicle by which the unmanned vehicle (10) is guided to travel along a traveling course (70) such that the unmanned vehicle (10) moves in a target movement direction to a target earth unloading position (41) of a hopper pit, and the unmanned vehicle (10) is caused to perform an earth unloading operation in a state in which a vehicle body interferes with the hopper pit (40), comprising:

finding a position obtained by shifting the target earth unloading position (41) in a direction of withdrawing from the hopper pit (40) that is a direction opposite to the target movement direction (43), to a position in which the body of the unmanned vehicle (10) does not interfere with the hopper pit (40) as a corrected target earth unloading position (42);

creating an area (61) of the hopper pit (40) as a hopper detour area (60) in which interference with the unmanned vehicle (10) is prohibited;

creating a corrected traveling course (70') for guiding the unmanned vehicle (10) to travel such that the unmanned vehicle (10) moves in the target movement direction (43) to the corrected target earth unloading position (42) without interfering with the hopper detour area (60), based on the hopper detour area (60), the corrected target earth unloading position (42), and the target movement direction (43) in the target earth unloading position (41);

guiding the unmanned vehicle (10) to travel along the created corrected traveling course (70') and causing the unmanned vehicle (10) to move in the target movement direction (43) to the corrected target earth unloading position (42); and further guiding the unmanned vehicle (10) to travel along a route (72) from the corrected target earth unloading position (42) to the target earth unloading position (41) and causing the unmanned vehicle (10) to move in the target movement direction (43) to the target earth unloading position (41).

The second invention provides:

a guided travel control method for an unmanned vehicle by which the unmanned vehicle (10) is guided to travel along a traveling course (70) such that the unmanned vehicle (10) moves in a target movement direction (43) to a target earth unloading position (41) of a hopper pit (40), and the unmanned vehicle (10) is caused to perform an earth unloading operation in a state in which a vehicle body interferes with the hopper pit (40), comprising:

finding two guard portions (63, 64) that have an opening (65) into which the unmanned vehicle (10) enters, contain inside thereof an area (61a) in which the vehicle body interferes with the hopper pit (40), and protrude outward from an edge of the hopper pit (40) in a direction opposite to the target movement direction (43) based on the target earth unloading position (41), the target movement direction (43) in the target earth unloading position (41), data indicating a body width of the unmanned vehicle (10), and data indicating the area (61) of the hopper pit (40), and creating an area obtained by subtracting an inner area of the two guards (63, 64) from an area obtained by adding the two guards (63, 64) to the area (61) of the hopper pit (40) as a hopper detour area (60) in which interference with the unmanned vehicle (10) is prohibited;

creating a traveling course (70) for guiding the unmanned vehicle (10) to travel such that the unmanned vehicle (10) moves in the target movement direction (43) to the target earth unloading position (41) without interfering with the hopper detour area (60), based on the hopper detour area (60), the target earth unloading position (41), and the target movement direction (43) in the target earth unloading position (41); and guiding the unmanned vehicle (10) to travel along the created traveling course (70) and causing the unmanned vehicle (10) to move in the target movement direction (43) to the target earth unloading position (41).

The third invention provides:

the guided travel control method for an unmanned vehicle of the first invention that is applied to the case in which target earth unloading positions (41a, 41b, 41c) are set in a plurality of different locations around the same hopper pit (40) and a plurality of unmanned vehicles (10, 10', 10") are guided to travel, this method being applied to the case in which the corrected traveling courses (70', 73', 74') are created in advance before the guided travel, and comprising:

creating an area (61) of the hopper pit (40) or an area obtained by adding areas (68, 69) in which other unmanned vehicles (10', 10") can be present in other target earth unloading position (41b, 41c) to the area (61) of the hopper pit (40), as the hopper detour area (60) in which interference with the unmanned vehicle (10) is prohibited; and creating a corrected traveling course (70') for guiding the unmanned vehicle (10) to travel such that the unmanned vehicle (10) moves in the target movement direction (43) to the corrected target earth unloading position (42) without interfering with the hopper detour area (60), based on the hopper detour area (60), the corrected target earth unloading position (42), and the target movement direction (43) in the target earth unloading position (41a).

The fourth invention provides:

the guided travel control method for an unmanned vehicle of the second invention that is applied to the case in which target earth unloading positions (41a, 41b, 41c) are set in a plurality of different locations around the same hopper pit (40) and a plurality of unmanned vehicles (10, 10', 10") are guided to travel, this method being applied to the case in which the traveling courses (70, 73, 74) are created in advance before the guided travel, and comprising:

finding two guard portions (63, 64) that have an opening (65) into which the unmanned vehicle enters (10), contain inside thereof the area (61a) in which the vehicle body interferes with the hopper pit (40), and protrude outward from an edge of the hopper pit (40) in a direction opposite to the target movement direction (43) based on the target earth unloading position (41a), target movement direction (43) in the target earth unloading position (41a), data indicating a body width of the unmanned vehicle (10), and data indicating the area (61) of the hopper pit (40), and creating an area obtained by subtracting an inner area of the two guards (63, 64) from an area obtained by adding the two guards (63, 64) to the area (61) of the hopper pit (40), or an area obtained by subtracting an inner area of the two guards (63, 64) from an area obtained by adding areas (68, 69) in which other unmanned vehicles (10', 10") can be present in other target earth unloading positions (41b, 41c) to this area, as a hopper detour area (60) in which interference with the unmanned vehicle (10) is prohibited; and creating a traveling course (70) for guiding the unmanned vehicle (10) to travel such that the unmanned vehicle (10) moves in the target movement direction (43) to the target earth unloading position (41a) without interfering with the hopper detour area (60), based on the hopper detour area (60), the target earth unloading position (41a), and the target movement direction (43) in the target earth unloading position (41a).

The fifth invention provides:

the guided travel control method for an unmanned vehicle of the first invention that is applied to the case in which target earth unloading positions (41a, 41b, 41c) are set in a plurality of different locations around the same hopper pit (40) and a plurality of unmanned vehicles (10, 10', 10") are guided to travel, this method comprising:

determining whether other unmanned vehicles (10', 10") are present in other target earth unloading positions (41b, 41c) or move toward the other target earth unloading positions (41b, 41c) when the unmanned vehicle (10) is guided to travel to the target earth unloading position (41a);

in the case where the other unmanned vehicles (10', 10") are determined to be present in the other target earth unloading positions (41b, 41c) or move toward the other target earth unloading positions (41b, 41c) when the unmanned vehicle (10) is guided to travel to the target earth unloading position (41a), creating the area (61) of the hopper pit (40) or an area obtained by adding areas (68, 69) in which the other unmanned vehicles (10', 10") can be present in the other target earth unloading positions (41b, 41c) to the area (61) of the hopper pit (40), as a hopper detour area (60) in which interference with the unmanned vehicle (10) is prohibited; and creating a corrected traveling course (70') for guiding the unmanned vehicle (10) to travel such that the unmanned vehicle (10) moves in the target movement direction (43) to the corrected target earth unloading position (42) without interfering with the hopper detour area (60), based on the hopper detour area (60), the corrected target earth unloading position (42), and the target movement direction (43) in the target earth unloading position (41a).

The sixth invention provides:

the guided travel control method for an unmanned vehicle of the second invention that is applied to the case in which target earth unloading positions (41a, 41b, 41c) are set in a plurality of different locations around the same hopper pit (40) and a plurality of unmanned vehicles (10, 10', 10") are guided to travel, this method comprising:

determining whether other unmanned vehicles (10', 10") are present in other target earth unloading positions (41b, 41c) or move toward the other target earth unloading positions (41b, 41c) when the unmanned vehicle (10) is guided to travel to the target earth unloading position (41a);

in the case where the other unmanned vehicles (10', 10") are determined to be present in the other target earth unloading positions (41b, 41c) or move toward the other target earth unloading positions (41b, 41c) when the unmanned vehicle (10) is guided to travel to the target earth unloading position (41a), finding two guard portions (63, 64) that have an opening (65) into which the unmanned vehicle enters (10), contain inside thereof the area (61a) in which the vehicle body interferes with the hopper pit (40), and protrude outward from an edge of the hopper pit (40) in a direction opposite to the target movement direction (43) based on the target earth unloading position (41a), target movement direction (43) in the target earth unloading position (41a), data indicating a body width of the unmanned vehicle (10), and data indicating the area (61) of the hopper pit (40), and creating an area obtained by subtracting an inner area of the two guards (63, 64) from an area obtained by adding the two guards (63, 64) to the area (61) of the hopper pit (40), or an area obtained by subtracting an inner area of the two guards (63, 64) from an area obtained by adding areas (68, 69) in which other unmanned vehicles (10', 10") can be present in other target earth unloading positions (41b, 41c) to this area, as a hopper detour area (60) in which interference with the unmanned vehicle (10) is prohibited; and creating a traveling course (70) for guiding the unmanned vehicle (10) to travel such that the unmanned vehicle (10) moves in the target movement direction (43) to the target earth unloading position (41a) without interfering with the hopper detour area (60), based on the hopper detour area (60), the target earth unloading position (41a), and the target movement direction (43) in the target earth unloading position (41a).

The seventh to twelfth inventions provide apparatuses corresponding to the above-described first to sixth inventions.

The thirteenth invention provides an apparatus corresponding to the first invention and the seventh invention based on the block-diagram shown in FIG. 7.

With the first invention, as shown in FIGS. 2A, 2B, a position obtained by shifting the target earth unloading position 41 in the direction of withdrawing from the hopper pit 40 that is the direction opposite to the target movement direction 43 to a position in which the body of the unmanned vehicle 10 does not interfere with the hopper pit 40 is found as a corrected target earth unloading position 42.

Then, an area 61 of the hopper pit 40 is created as a hopper detour area 60 in which interference with the unmanned vehicle 10 is prohibited.

Then, a corrected traveling course 70' for guiding the unmanned vehicle 10 to travel is created such that the unmanned vehicle 10 moves in the target movement direction 43 to the corrected target earth unloading position 42 without interfering with the hopper detour area 60, based on the hopper detour area 60, the corrected target earth unloading position 42, and the target movement direction 43 in the target earth unloading position 41.

Then, the unmanned vehicle 10 is guided to travel along the created corrected traveling course 70'. The unmanned vehicle 10 is thereby caused to move in the target movement direction 43 to the corrected target earth unloading position 42.

The unmanned vehicle 10 is then further guided to travel along a route 72 from the corrected target earth unloading position 42 to the target earth unloading position 41. The unmanned vehicle 10 is thereby caused to move in the target movement direction 43 to the target earth unloading position 41.

With the first invention, acquiring data (target position, target movement direction) on the target earth unloading point 41 makes it possible to set freely the traveling course 70 for detouring the hopper detour area 60 and reaching the target earth unloading point 41. Therefore, when the traveling course 70 is taught, the traveling course 70 can be created by teaching only the target earth unloading point 41, without traveling through all the passage points of the traveling course 70, prior to the guided travel. As a result, the efficiency of teaching operation is increased and operation efficiency is increased.

Further, where the unmanned vehicle 10 is guided to travel along the created traveling course 70, the unmanned vehicle 10 reaches the target earth unloading point 41 (point that interferes with the hopper pit 40) of the hopper pit 40, while detouring the hopper detour area 60 (hopper pit 40). As a result, the unmanned vehicle 10 can reach the target earth unloading point 41 of the hopper pit 40 with good accuracy without interfering with the hopper pit 40 during traveling.

According to the second invention, as shown in FIGS. 3A, 3B, the hopper detour area 60 is created based on the target earth unloading position 41, the target movement direction 43 in the target earth unloading position 41, data on the body width of the unmanned vehicle 10, and data indicating an area 61 of the hopper pit 40. Thus, first, two guard portions 63, 64 that have an opening 65 into which the unmanned vehicle 10 enters, contain inside thereof an area 61a in which the vehicle body interferes with the hopper pit 40, and protrude outward from an edge of the hopper pit 40 in a direction opposite to the target movement direction 43 are found. Then, an area obtained by adding the two guards 63, 64 to the area 61 of the hopper pit 40 is found. Then, an area obtained by subtracting an inner area of the two guards 63, 64 from the found area is taken as a hopper detour area 60 in which interference with the unmanned vehicle 10 is prohibited.

A traveling course 70 for guiding the unmanned vehicle 10 to travel such that the unmanned vehicle 10 moves in the target movement direction 43 to the target earth unloading position 41 without interfering with the hopper detour area 60, is then created based on the hopper detour area 60, the target earth unloading position 41, and the target movement direction 43 in the target earth unloading position 41.

The unmanned vehicle 10 is then guided to travel along the created traveling course 70. The unmanned vehicle 10 is thereby caused to move in the target movement direction 43 to the target earth unloading position 41.

The effect obtained with the second invention is identical to that obtained with the first invention.

The third invention is based on the first invention and applied, as shown in FIGS. 4A, 4B, to the case in which target earth unloading positions 41a, 41b, 41c are set in a plurality of different locations around the same hopper pit 40 and a plurality of unmanned vehicles 10, 10', 10" are guided to travel. This method is applied to the case in which the traveling courses 70, 73, 74 (corrected traveling courses 70', 73', 74') are created in advance before the guided travel.

An area (hatched portion) obtained by adding areas 68, 69 in which other unmanned vehicles 10', 10" can be present in other target earth unloading position 41b, 41c to the area 61 of the hopper pit 40 is created as a hopper detour area 60 in which interference with the unmanned vehicle 10 is prohibited. However, it is sometimes impossible, for example, because of a narrow area of the earth unloading site 50, not to pass through the areas 68, 69 in which other unmanned vehicles 10', 10" can be present in other target earth unloading position 41b, 41c. In such cases, similarly to the first invention, the area 61 of the hopper pit 40 shown in FIGS. 2A, 2B is taken as the hopper detour area 60 in which interference with the unmanned vehicle 10 is prohibited.

Then, a corrected traveling course 70' for guiding the unmanned vehicle 10 to travel such that the unmanned vehicle 10 moves in the target movement direction 43 to the corrected target earth unloading position 42 without interfering with the hopper detour area 60, is created based on the hopper detour area 60, the corrected target earth unloading position 42, and the target movement direction 43 in the target earth unloading position 41a.

With the third invention, where the unmanned vehicle 10 is guided to travel along the created traveling course 70, the unmanned vehicle 10 reaches the target earth unloading point 41a (point that interferes with the hopper pit 40) of the hopper pit 40, while detouring the hopper detour area 60 (hopper pit 40 and other unmanned vehicles 10', 10") including the area where other unmanned vehicles 10', 10" can be present. Alternatively, the unmanned vehicle 10 reaches the target earth unloading point 41a (point that interferes with the hopper pit 40) of the hopper pit 40, while detouring the area 61 of the hopper pit 40. However, in this case, where the unmanned vehicle 10 travels without stopping, it can interfere with the leading unmanned vehicles 10', 10". Therefore, the unmanned vehicle may be caused to pass through the aforementioned areas 68, 69 in which other unmanned vehicles 10', 10" can be present after the leading unmanned vehicles 10', 10" have completed the earth unloading operation at the hopper pit 40 and departed from the hopper pit 40, for example, by using a technique similar to the Conventional Technology 3.

With the present invention, when a plurality of unmanned vehicles 10, 10', 10" are guided to travel in almost the same interval to the same hopper pit 40, or when the unmanned vehicle 10 is guided to travel to the hopper pit 40 while other unmanned vehicles 10', 10" are performing the earth unloading operation at the same hopper pit 40, the target earth unloading point 41a can be reached with a minimum waiting time and with good accuracy, while reliably preventing the interference with unmanned vehicles located in the vicinity of the hopper pit 40.

The fourth invention is based on the second invention and applied, as shown in FIGS. 5A, 5B, to the case in which target earth unloading positions 41a, 41b, 41c are set in a plurality of different locations around the same hopper pit 40 and a plurality of unmanned vehicles 10, 10', 10" are guided to travel. This method is applied to the case in which the traveling courses 70, 73, 74 are created in advance before the guided travel.

The hopper detour area 60 area is created based on the target earth unloading position 41a, target movement direction 43 in the target earth unloading position 41a, data indicating the body width of the unmanned vehicle 10, and data indicating an area 61' of the hopper pit 40. Thus, two guard portions 63, 64 that have an opening 65 into which the unmanned vehicle 10 enters, contain inside thereof the area 61a in which the vehicle body interferes with the hopper pit 40, and protrude outward from an edge of the hopper pit 40 in a direction opposite to the target movement direction 43 are found. Then, an area obtained by adding the two guard portions 63, 64 and areas 68, 69 in which other unmanned vehicles 10', 10" can be present in other target earth unloading position 41b, 41c to the area 62 of the hopper pit 40 is found. An area (hatched portion) obtained by subtracting the inner area of the two guard portions 63, 64 from the aforementioned area is taken as a hopper detour area 60 in which interference with the unmanned vehicle 10 is prohibited. However, it is sometimes impossible, for example, because of a narrow area of the earth unloading site 50, not to pass through the areas 68, 69 in which other unmanned vehicles 10', 10" can be present in other target earth unloading position 41b, 41c. In such cases, similarly to the second invention, the area shown by hatching in FIG. 3B is taken as the hopper detour area 60 in which interference with the unmanned vehicle 10 is prohibited.

A traveling course 70 for guiding the unmanned vehicle 10 to travel such that the unmanned vehicle 10 moves in the target movement direction 43 to the target earth unloading position 41a without interfering with the hopper detour area 60, is then created based on the hopper detour area 60, the target earth unloading position 41a, and the target movement direction 43 in the target earth unloading position 41a.

The effect obtained with the fourth invention is identical to that obtained with the third invention.

The fifth invention is based on the first invention and applied, as shown in FIGS. 4A, 4B, to the case in which target earth unloading positions 41a, 41b, 41c are set in a plurality of different locations around the same hopper pit 40 and a plurality of unmanned vehicles 10, 10', 10" are guided to travel.

With this method, it is determined whether other unmanned vehicles 10', 10" are present in other target earth unloading positions 41b, 41c or move toward the other target earth unloading positions 41b, 41c when the unmanned vehicle 10 is guided to travel to the target earth unloading position 41a. Where the other unmanned vehicles 10', 10" are determined to be present in the other target earth unloading positions 41b, 41c or move toward the other target earth unloading positions 41b, 41c, the area (hatched area) obtained by adding the areas 68, 69 in which the other unmanned vehicles 10', 10" can be present in the other target earth unloading positions 41b, 41c to the hopper detour area 60 of the first invention is created as a hopper detour area 60 in which interference with the unmanned vehicle 10 is prohibited. However, it is sometimes impossible, for example, because of a narrow area of the earth unloading site 50, not to pass through the areas 68, 69 even when other unmanned vehicles 10', 10" are present in other target earth unloading position 41b, 41c or move toward the other target earth unloading position 41b, 41c. In such cases, the aforementioned areas 68, 69 can be passed after the leading other unmanned vehicles 10', 10" have completed the earth unloading operation and departed from the hopper pit 40. Therefore, in this case, similarly to the first invention, the area 61 of the hopper pit 40 shown in FIGS. 2A, 2B is taken as the hopper detour area 60 in which interference with the unmanned vehicle 10 is prohibited.

The corrected traveling course 70' for guiding the unmanned vehicle 10 to travel such that the unmanned vehicle 10 moves in the target movement direction 43 to the corrected target earth unloading position 42 without interfering with the hopper detour area 60, is created based on the hopper detour area 60, the corrected target earth unloading position 42, and the target movement direction 43 in the target earth unloading position 41a.

Where the determination results are such that the other unmanned vehicles 10', 10" are not determined to be present in the other target earth unloading positions 41b, 41c or move toward the other target earth unloading positions 41b, 41c, a course that passes through the areas 68, 69 may be created. In other words, the hopper detour area 60 of the first invention, that is, the hopper detour area 60 that does not take into account the presence of other unmanned vehicles 10', 10" can be set, and a traveling course that passes in the vicinity of other earth unloading point 41b (a point in which the other unmanned vehicle 10', provided that it is present, would interfere) can be also set (see broken line in FIG. 4A).

The effect obtained with the fifth invention is identical to that obtained with the third invention.

The sixth invention is based on the second invention and applied, as shown in FIGS. 5A, 5B, to the case in which target earth unloading positions 41a, 41b, 41c are set in a plurality of different locations around the same hopper pit 40 and a plurality of unmanned vehicles 10, 10', 10" are guided to travel.

With this method, it is determined whether other unmanned vehicles 10', 10" are present in other target earth unloading positions 41b, 41c when the unmanned vehicle 10 is guided to travel to the target earth unloading position 41a. Where the other unmanned vehicles 10', 10" are determined to be present in the other target earth unloading positions 41b, 41c, the area obtained by adding the areas 68, 69 in which the other unmanned vehicles 10', 10" can be present in the other target earth unloading positions (41b, 41c) to the hopper detour area 60 of the second invention is found. Then, an area (hatched portion) obtained by subtracting the inner area of the two guard portions 63, 64 from the aforementioned area is taken as a hopper detour area 60 in which interference with the unmanned vehicle 10 is prohibited. However, it is sometimes impossible, for example, because of a narrow area of the earth unloading site 50, not to pass through the areas 68, 69 even when other unmanned vehicles 10', 10" are present in other target earth unloading position 41b, 41c or move toward the other target earth unloading position 41b, 41c. In such cases, the aforementioned areas 68, 69 can be passed after the leading other unmanned vehicles 10', 10" have completed the earth unloading operation and departed from the hopper pit 40. Therefore, in this case, similarly to the second invention, the area shown by hatching in FIG. 3B is taken as the hopper detour area 60 in which interference with the unmanned vehicle 10 is prohibited.

A traveling course 70 for guiding the unmanned vehicle 10 to travel such that the unmanned vehicle 10 moves in the target movement direction 43 to the target earth unloading position 41a without interfering with the hopper detour area 60, is then created based on the hopper detour area 60, the target earth unloading position 41a, and the target movement direction 43 in the target earth unloading position 41a.

Where the determination results are such that the other unmanned vehicles 10', 10" are not determined to be present in the other target earth unloading positions 41b, 41c or move toward the other target earth unloading positions 41b, 41c, a course that passes through the areas 68, 69 may be created. In other words, the hopper detour area 60 of the second invention, that is, the hopper detour area 60 that does not take into account the presence of other unmanned vehicles 10', 10" can be set, and a traveling course that passes in the vicinity of other earth unloading point 41b (a point in which the other unmanned vehicle 10', provided that it is present, would interfere) can be also set (see broken line in FIG. 5A).

BRIEF DESCRIPTION OF THE DRAWINGS

FIGS. 2A, 2B are top views illustrating the vicinity of a hopper pit that are used to explain the first embodiment;

FIGS. 3A, 3B are top views illustrating the vicinity of a hopper pit that are used to explain the second embodiment;

FIG. 5A is a top view of the entire earth unloading site that is used to explain the fifth and sixth embodiments; FIG. 5B illustrates the hopper pit in the fifth and sixth embodiments;

FIGS. 8A, 8B are flowcharts illustrating the sequence of processing in the first embodiment;

FIGS. 10A, 10B are flowcharts illustrating the processing sequence in the second embodiment;

FIGS. 11A through 11C are flowcharts illustrating the processing sequence for finding respective hopper detour areas;

DETAILED DESCRIPTION OF THE INVENTION

An embodiment of the guided traveling control apparatus for an unmanned vehicle in accordance with the present invention will be described below with reference to the appended drawings.

Figure 1:
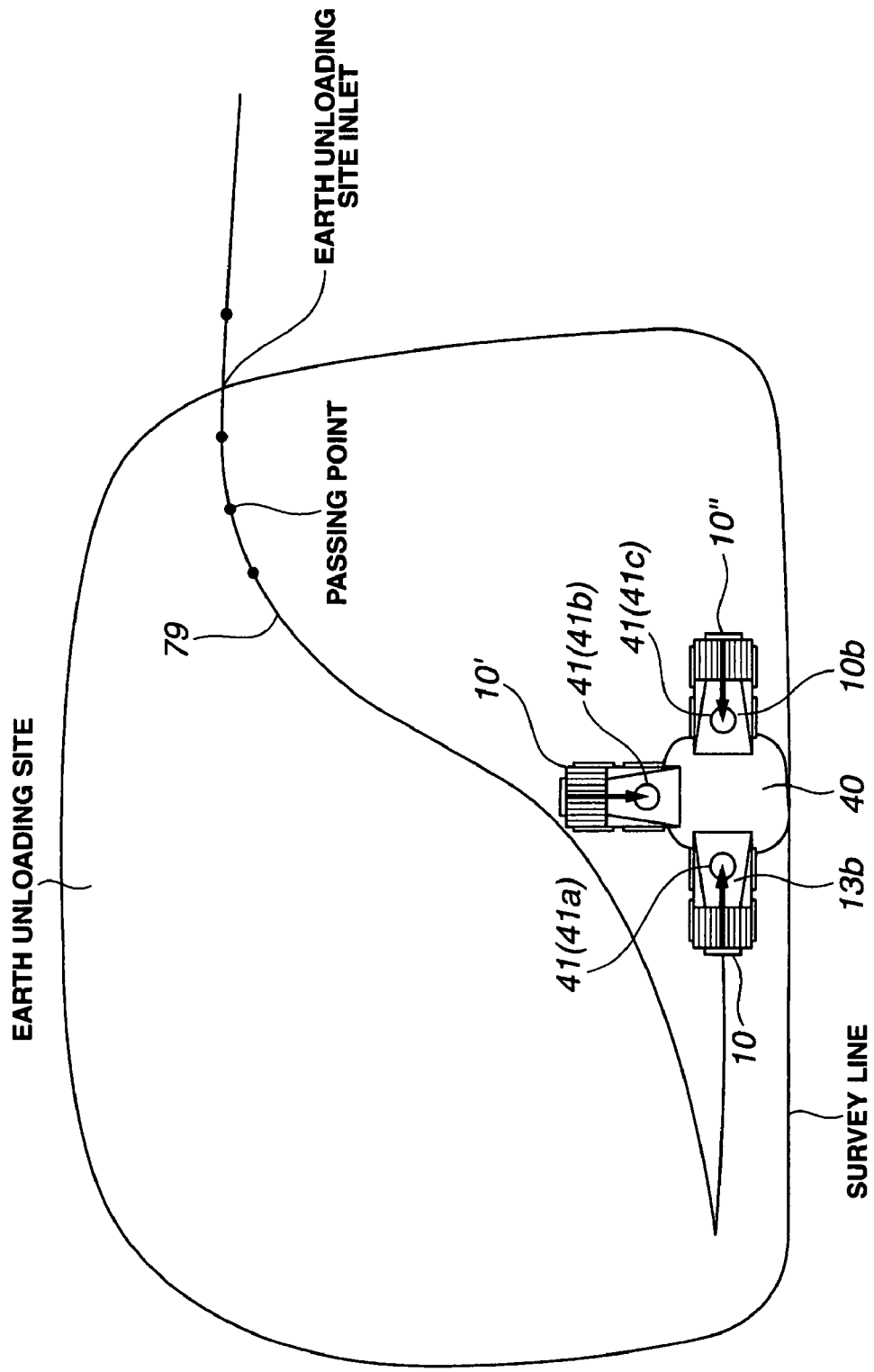
FIG. 1 illustrates the conventional technology.
Figure 4A:
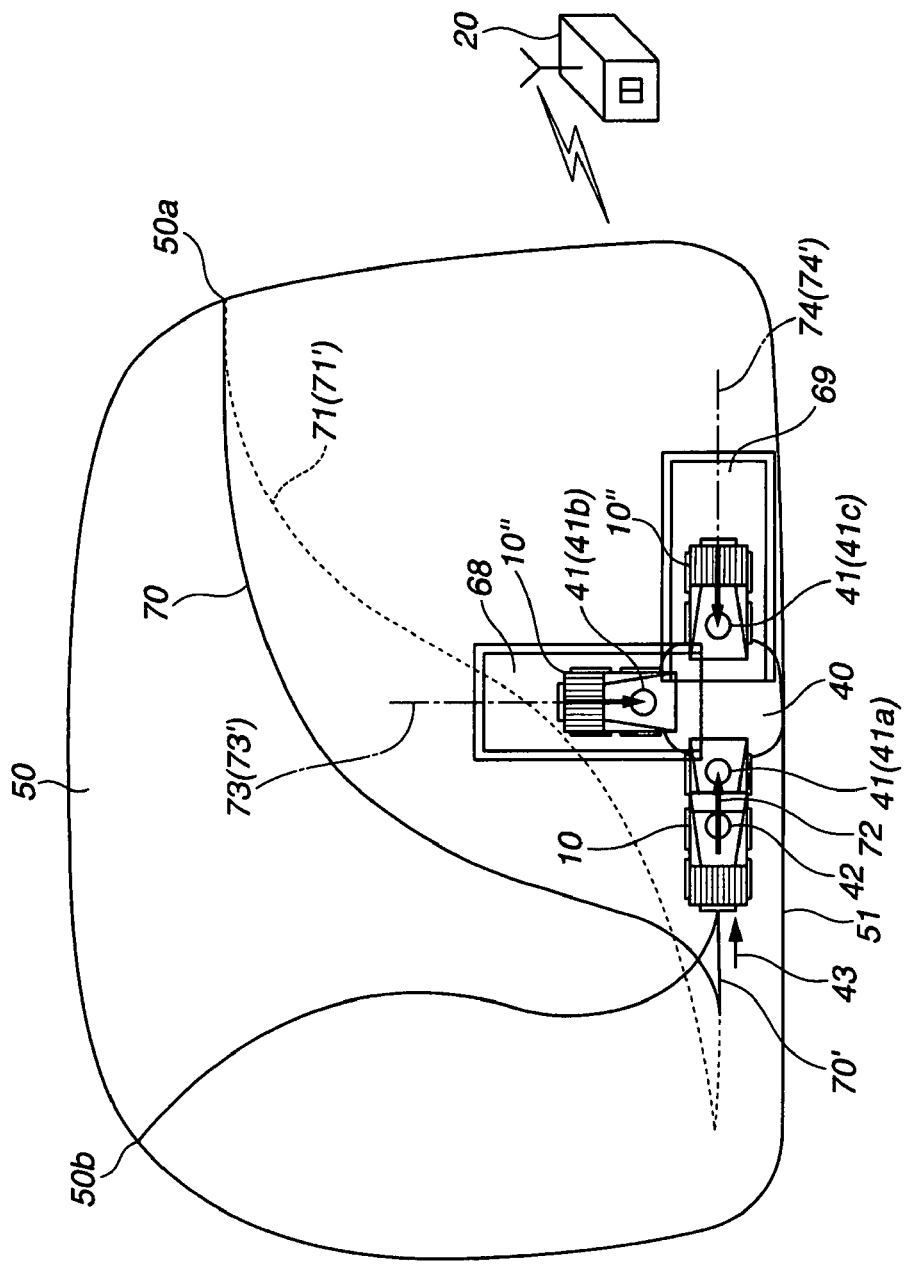
FIG. 4A is a top view of the entire earth unloading site that is used to explain the third and fourth embodiments.
Figure 4B:
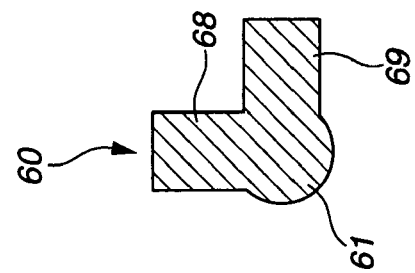
FIG. 4B illustrates the hopper pit in the third and fourth embodiments.

FIGS. 4A, 4B show schematically an operation site of the embodiment. In the present embodiment, a case is assumed in which an unmanned vehicle 10 is guided to travel along a traveling course 70 so that the unmanned vehicle 10 advances in the target advancement direction 43 to a target position 41 of a target earth unloading point of a hopper pit 40 located in an earth unloading site 50 of a large-scale mining site and an operation of unloading the earth from the unmanned vehicle 10 is performed in a state in which the vehicle body interferes with the hopper pit 40. An unmanned off-load dumping truck that transports earth loaded on a load-carrying platform 10b to the hopper pit 40 and unloads the earth in the hopper pit 40 is considered as the unmanned vehicle 10. When a plurality of unmanned vehicles are described separately hereinbelow, the reference symbol 10 is assigned with a dash to identify other unmanned vehicle. Further, when a plurality of unmanned vehicles are not distinguished, they will be represented by unmanned vehicle 10. When a plurality of earth unloading points are distinguished, reference symbols 41a, 41b, 41c are used, and when the earth unloading points are not distinguished, the reference symbol 41 is used. The traveling course 70 will be assumed below to represent a traveling route within the earth unloading site 50. The traveling routes outside the earth unloading site 50 will be taken as common traveling courses for a plurality of unmanned vehicles 10, 10', 10", and will be explained separately from the traveling route 70 within the earth unloading site 50.

A plurality of earth unloading points 41a, 41b, 41c are set around the hopper pit 40. When the unmanned vehicle 10 travels in the earth unloading site 50, the designated earth unloading point from among the earth unloading points located around the hopper pit 40 is taken as a target earth unloading point. As described below, the path of the traveling course 70 within the earth unloading site 50 differs depending on the designated earth unloading point or the presence of other unmanned vehicle.

The survey line 51 shown in FIG. 4A is a boundary line of the earth unloading site 50, and the area outside the survey line 51 is an area such as a steep road in which the travel is prohibited. An inlet 50a and an outlet 50b are provided in the earth unloading site 50. The unmanned vehicle 10 travels along the common traveling course outside the earth unloading site 50, enters the earth unloading site 50 from the inlet 50a of the earth unloading site, and travels along the predetermined traveling route 70. In the vicinity of the designated target earth unloading point 41 of the hopper pit 40, the vehicle changes the movement mode from forward to rearward (switching travel), advances in the target advancement direction 43 to the target earth unloading point 41 by rearward traveling, and stops at the target earth unloading point 41. The load-carrying platform 10b of the unmanned vehicle 10 is then tilted (dumping operation) and the earth located in the load-carrying platform 10b is dropped into the hopper pit 40. After completion of the earth unloading operation, the unmanned vehicle 10 again travels along the predetermined traveling route 70. Thus, it travels forward from the target earth unloading point 41 toward the earth unloading site outlet 50b. The unmanned vehicle 10 that exits the earth unloading site 50, travels along the common traveling route.

In the operation site, a control station 20 is provided for controlling and monitoring a plurality of unmanned vehicles 10, 10', 10". In the present embodiment, traveling courses 70, 73, 74 of the unmanned vehicles 10, 10', 10" are created in the control station 20, and data relating to the traveling courses 70, 73, 74 are transmitted from the control station 20 to the unmanned vehicles 10, 10', 10", whereby the unmanned vehicles 10, 10', 10" are guided and caused to travel along the respective traveling courses 70, 73, 74. Further, during teaching operation preceding the actual guided travel, operators drive the unmanned vehicles 10, 10', 10" to perform the teaching operation.

Figure 6A:
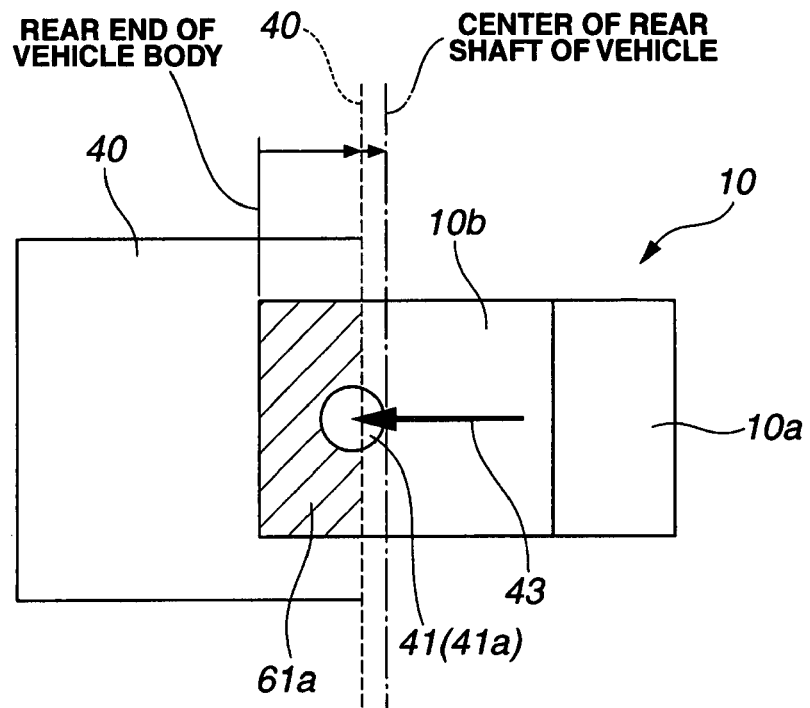
FIGS. 6A, 6B are respectively a top view and a side view illustrating the external appearance of an unmanned vehicle; the figures illustrate a state in which the unmanned vehicle is positioned in an earth unloading point.
Figure 6B:
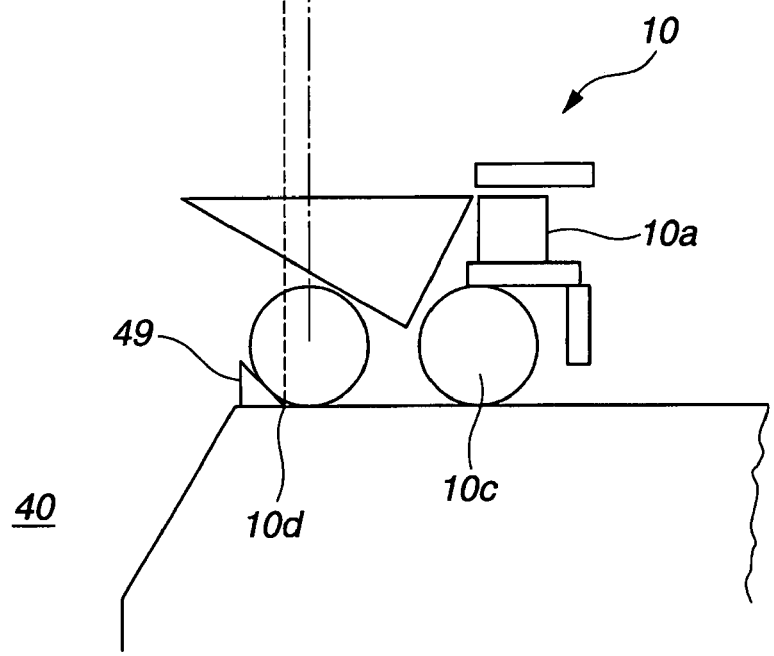

FIGS. 6A, 6B are a top view and a side view illustrating the external appearance of the unmanned vehicle 10 and show the state in which the unmanned vehicle 10 is positioned at the earth unloading point.

An operator seat 10a is provided in the front section of the unmanned vehicle 10, the load-carrying platform (vessel, body) 10b is provided in the rear side of the vehicle, and the vehicle is provided with front wheels 10c and rear wheels 10d. The unmanned vehicle 10 is a front-wheel steering vehicle.

A standard position that specifies the position of an unmanned vehicle is set in the unmanned vehicle 10, and the unmanned vehicle 10 is determined to have reached the target earth unloading point 41 when the difference between this standard position and the coordination position of the earth unloading point 41 (41a) that is set as a target is within a predetermined range. The coordination position of the earth unloading point 41 and the standard position of the unmanned vehicle 10 are set in a positional relationship such that when the unmanned vehicle 10 reaches the target earth unloading point 41, the rear wheels 10d of the unmanned vehicle immediately come into contact with a wheel stopper 49 provided at an edge 40b of the hopper pit 40. When the unmanned vehicle 10 is positioned in the target earth unloading point 41, part of the load-carrying platform 10b of the unmanned vehicle 10 interferes with a partial area 61a (shown by hatching) of the hopper pit 40.

Figure 7:
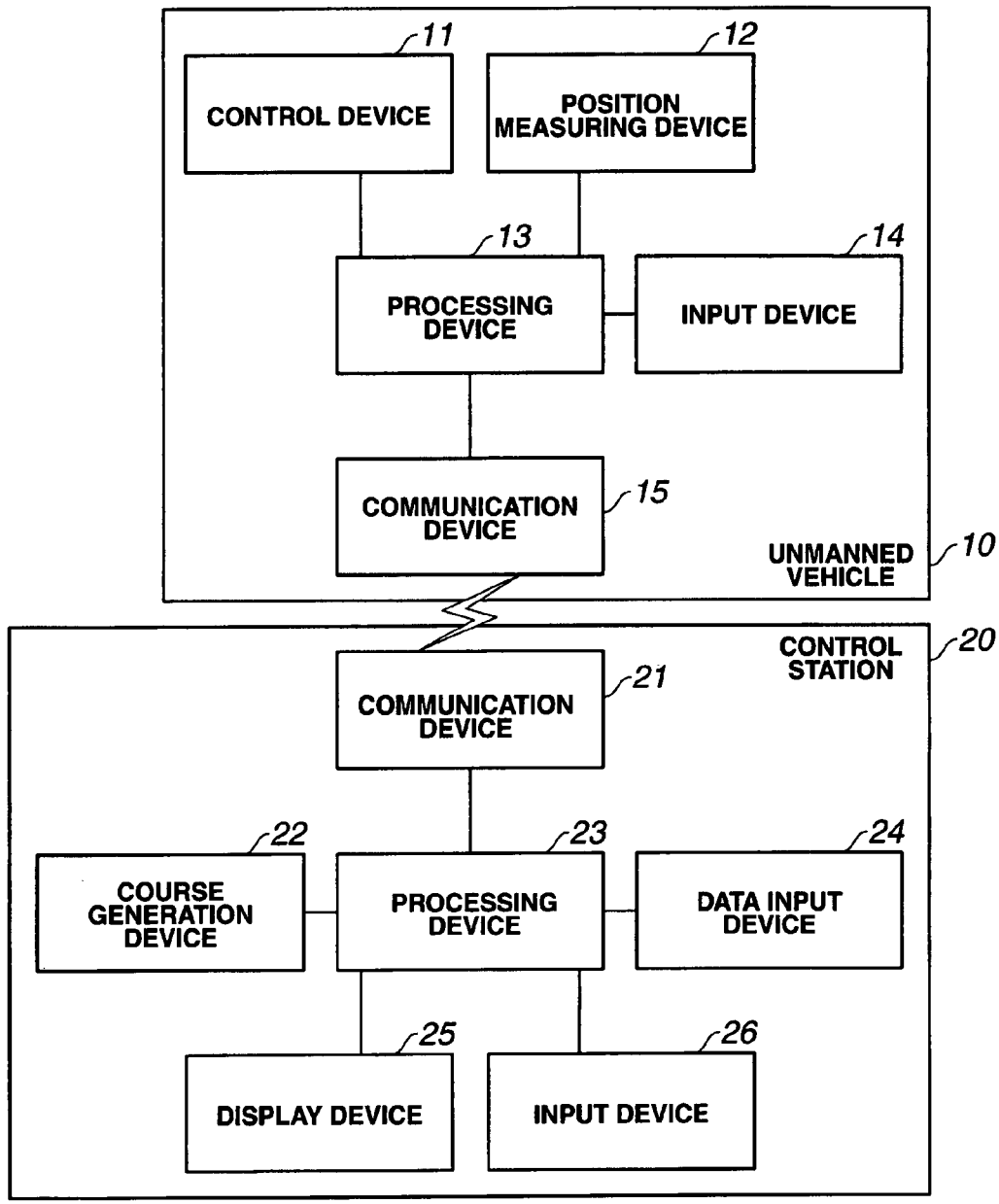
FIG. 7 illustrates the internal configuration of an unmanned vehicle and an internal configuration of a control and management station.

FIG. 7 shows the internal configuration of the unmanned vehicle 10 and the internal configuration of the control station 20.

The control station 20 is provided with a communication device 21, a course generation device 22, a processing device 23, a data input device 24, a display device 25, and an input device 26. On the other hand, the unmanned vehicle 10 comprises a control device 11, a position measuring device 12, a processing device 13, an input device 14, and a communication device 15. Other unmanned vehicles 10', 10" have the same configuration.

In the position measuring device 12 of the unmanned vehicle 10, the present position and movement direction of the unmanned vehicle are measured. For example, a GPS is used as means for measuring the position and movement direction. The unmanned vehicle position and unmanned vehicle movement direction may be also measured based on the output signals of a tire revolution speed sensor and output signals of a gyroscope.

The input device 14 inputs teaching data relating to the earth unloading points 41 of the hopper pit 40 when the operator drives the unmanned vehicle 10 during teaching operation. Where the unmanned vehicle 10 reaches the earth unloading point 41 (hopper bay) of the hopper pit 40, the operator performs an input operation for recording the reached position as a target earth unloading point.

The processing device 13 fetches in from the position measuring device 12 the measurement data relating to the position and movement direction in response to the input operation of the input device 14 when the input operation is performed, and associates the measurement data relating to the position and movement direction at this time with the teaching data (position and movement direction) of the earth unloading point 41 of the hopper pit 40. The processing device 13 performs a processing of sending the teaching data to the communication device 15. The communication device 15 sends the teaching data to the communication device 21 of the control station 20 by wireless communication.

The position and movement direction of the unmanned vehicle 10 that were measured in the position measuring device 13 are fetched in the processing device 13 at each predetermined timing. The processing device 13 performs a process of sending the fetched data relating to the position and movement direction of the unmanned vehicle to the communication device 15. The communication device 15 sends the sequential data relating to the position and movement direction of the unmanned vehicle to the communication device 21 of the control station 20.

Data on the traveling course 70 that were sent from the communication device 21 of the control station 20 are received by the communication device 15.

Data on the traveling course 70 are fetched in the processing device 13. Once data on the traveling course 70 are fetched in, the control device 11 is instructed to perform traveling control of the unmanned vehicle 10 along the traveling course 70.

Where the control device 11 receives the traveling control instruction from the processing device 13, the control device controls a traveling mechanism and a steering mechanism (not shown in the figure) so that the unmanned vehicle 10 is caused to travel along the traveling course 70. Thus, a traveling command and a steering command are generated and outputted to the traveling mechanism and steering mechanism so that the subsequent passage point of the unmanned vehicle 10 on the traveling course 70 is passed, without displacement with respect to the target position and target movement direction, while comparing the present unmanned vehicle position and unmanned vehicle movement direction of the unmanned vehicle 10 that are measured in the position measuring device 12 with the target position and target movement direction in the sequence of passage points on the traveling course 70. As a result, the unmanned vehicle 10 is guided to travel along the predetermined traveling course 70 and advances in the target movement direction to the target earth unloading position of the target earth unloading point 41.

Where the guided travel along the traveling course 70 is completed, the control device 11 sends a message to this effect to the processing device 13. Where the processing device 13 receives data to the effect that the guided travel along the traveling course 70 is completed, it generates course request data required to perform guided travel along the next traveling course. The course request data are similarly generated even in the initial state in which the power source of the unmanned vehicle 10 is turned on. The processing device 13 performs a processing of sending the generated course request data to the communication device 15. The communication device 15 sends the course request data to the communication device 21 of the control station 20 by wireless communication. A code that identifies the unmanned vehicle (unmanned vehicles 10, 10', 10") for which the course is requested is assigned to the course request data.

The control station 20 will be described below.

The communication device 21 of the control station 20 receives the data sent from the communication device 15 of the unmanned vehicle 10. The received data are transmitted to the processing device 23.

Topographic data of the earth unloading site 50, that is, data relating to the position and shape of the survey line 51, inlet 50a, outlet 50b, and hopper pit 40 of the earth unloading site 50 are inputted to the data input device 24 of the control station 20 via the data input device 24 comprising a keyboard or the like. The data input device 24 transmits the topographic data of the earth unloading site 50 to the processing device 23.

In the processing device 23, image display data for displaying the earth unloading site 50 on a display screen are generated based on the topographic data of the earth unloading site 50 that were fetched in, and the generated image display data are transmitted to the display device 25.

In the communication device 21, data relating to the position and movement direction of the unmanned vehicles 10, 10', 10" are received. The communication device 21 sends the data on the position and movement direction of the unmanned vehicles to the processing device 23. In the processing device 23, image display data for displaying the unmanned vehicles 10, 10', 10" on a display screen are generated based on the data on the position and movement direction of the unmanned vehicles that were fetched in and the generated data are sent to the display device 25.

In the display device 25, the earth unloading site 50 and unmanned vehicles 10, 10', 10" are displayed on the display screen based on the image display data that were fetched int. The display screen of the display device 25 demonstrates the posture in which each unmanned vehicle 10, 10', 10' is present in any position in the load unloading site 50.

The input device 26 is provided, similarly to the input device 14 of the unmanned vehicle 10, to perform the teaching operation. Where the display screen of the display device 25 is referred to confirm which of the unmanned vehicles 10, 10', 10" is positioned in the desired earth unloading point 41 (hopper bay) of the hopper pit 40, this unmanned vehicle (for example, the unmanned vehicle 10) is designated and an input operation is performed for recording the present position and the present movement direction of the designated unmanned vehicle as the target earth unloading point (position and movement direction). Alternatively, the position may be found with other measurement means, and an operation of inputting the coordinates and orientation as numerical values may be performed.

The processing device 23 associates the measurement data relating to the position and movement direction of the designated unmanned vehicle 10 when the input operation is performed with the teaching data (position and movement direction) of the earth unloading point 41 of the hopper pit 40 in response to the input operation of the input device 26.

The processing device 23 performs a processing of registering and saving the obtained teaching data in response to the input operation of the input device 26, or the teaching data transmitted from the unmanned vehicle 10 in the data input device 24 as the target earth unloading point 41 of the hopper pit 40. The teaching data are converted into image display data showing the target earth unloading point 41 of the hopper pit 40 and transmitted to the display device 25. The display device 25 receives the converted data and displays the image of the target earth unloading point 41 of the hopper pit 40 on the display screen.

Where the course request data are fetched in the processing device 23 from the unmanned vehicle 10, a target earth unloading point that is a guiding destination is selected from among a plurality of registered target earth unloading points 41, and an indication for generating a traveling course leading to the selected target earth unloading point is provided to the course generation device 22. The course generation device 22 receives this indication and generates a traveling course 70 for guiding the unmanned vehicle 10 for which the course request was made to travel within the earth unloading site 50 based on the registered teaching data and topographic data of the earth unloading site 50.

The following types of methods can be used for generating the traveling course 70, and these methods will be described below.

In the course generation device 22, the traveling course 70 is generated that guides the unmanned vehicle 10 that is the course request source from the inlet 50a of the earth unloading site 50 to the outlet 50b of the earth unloading site 50 via the target earth unloading point 41 of the hopper pit 40.

Data on the generated traveling course 70 are sent to the communication device 21. The communication device 21 sends the data on the traveling course 70 toward the communication device 15 of the unmanned vehicle 10 that is the course request source.

Embodiments will be described below for each method for generating the traveling course 70.

First Embodiment

The first embodiment is applied to the case in which one target earth unloading point 41 (for example, the target earth unloading point 41a) is registered around the hopper pit 40 in the earth unloading site 50. Alternatively, the first embodiment is applied to the case where, even if a plurality of target earth unloading points 41a, 41b, 41c are registered around the hopper pit 40 of the earth unloading site 50, a plurality of unmanned vehicles 10, 10', 10" are rarely guided to travel almost within the same interval to the earth unloading points 41a, 41b, 41c of the same hopper pit 40, and to the case where the unmanned vehicle 10 is rarely guided to travel to the hopper pit 40, while other unmanned vehicles 10', 10" are being unloaded at the same hopper pit 40. Where other unmanned vehicles 10', 10' that were guided earlier are present in the vicinity of the hopper pit 40 when the unmanned vehicle 10 is guided toward the hopper pit 40, this being a rare occasion, the unmanned vehicle 10 that arrived later may wait till the leading unmanned vehicles 10', 10" complete the earth unloading operation and depart from the hopper pit 40. The present embodiment is applied to the case, where waiting is rare and the decrease in productivity caused by waiting is sufficiently small. For example, a technique similar to that of Conventional Technology 3 can be used to avoid interference with the leading unmanned vehicles 10', 10".

The first embodiment will be explained below with reference to FIGS. 2A, 2B, the above-described FIGS. 6A, 6B, FIGS. 8A, 8B, and FIGS. 9A, 9B.

Figure 9A:
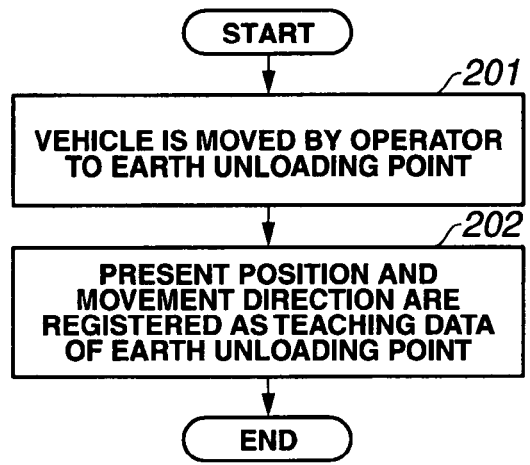
FIG. 9A is a flowchart of a teaching operation of earth unloading points.
Figure 9B:
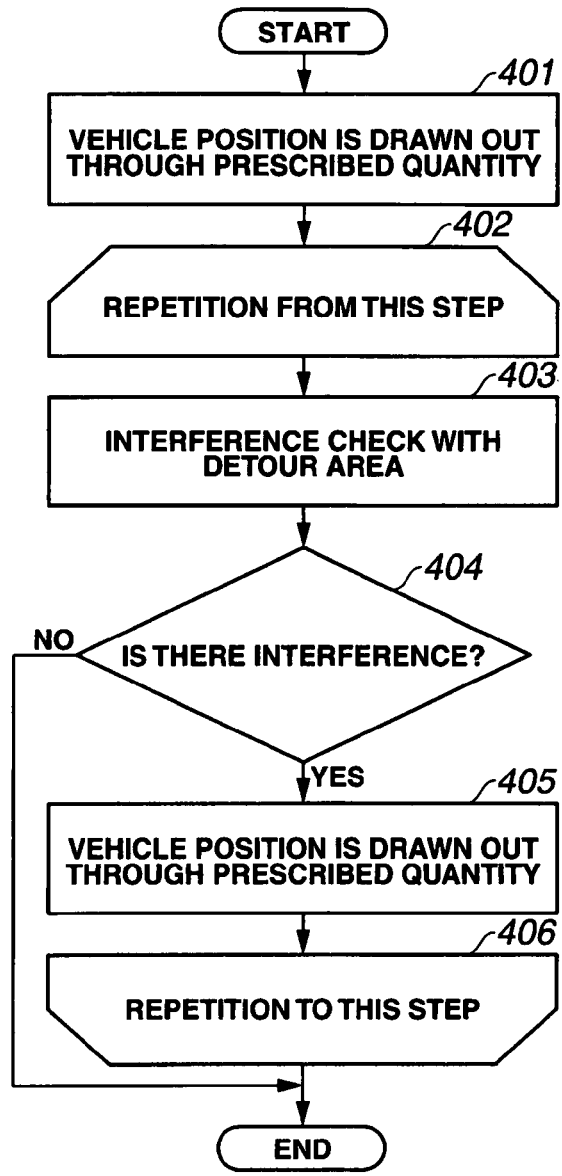
FIG. 9B is a flowchart illustrating the processing sequence of creating a corrected target earth unloading point.

FIGS. 2A, 2B are top views of the area in the vicinity of the hopper pit 40 of the earth unloading site 50. FIG. 8A is a flowchart illustrating the processing sequence performed in the case where a traveling course 70 is generated in advance before a course request is obtained from the unmanned vehicle 10 and then the unmanned vehicle 10 is guided to travel along the traveling course 70. FIG. 8B is a flowchart illustrating the processing sequence performed in the case where a traveling course 70 is generated after a course request is obtained from the unmanned vehicle 10 and then the unmanned vehicle 10 is guided to travel along the traveling course 70. FIG. 9A is a flowchart illustrating the teaching operation of the earth unloading point 41, and FIG. 9B is a flowchart illustrating the processing sequence of creating a corrected target earth unloading point 42.

As shown in FIG. 8A, in the control station 20, first, the topographic data of the earth unloading site 50 are inputted (step 101), and then the teaching data of the earth unloading point 41 (41a) of the hopper pit 40 are registered (step 102). This teaching operation is performed as shown in FIG. 9A. Thus, as shown in FIG. 9A, an operator sits in the unmanned vehicle 10 and drives the unmanned vehicle to the desired earth unloading point 41 (41a) of the hopper pit 40 (step 201). Then, the present position and the present movement direction of the unmanned vehicle 10 are registered as the teaching data (earth unloading position and movement direction in the earth unloading point) of the earth unloading point 41 (41a) (step 202).

Then, the processing flow moves to step 103 of FIG. 8A, and an instruction to generate a traveling course is issued in the control station 20 (step 103).

First, the target earth unloading point 41 (41*a*) is corrected and a corrected target earth unloading point 42 drawn out to a position in which the body of the unmanned vehicle 10 stops interfering with the hopper pit 40 is found (step 104). The processing of finding the corrected target earth unloading point 42 is performed as shown in FIG. 9B. Thus, as shown in FIG. 9B, the target earth unloading point 41 (41*a*) is drawn out through a prescribed quantity in the direction of withdrawing from the hopper pit 40 that is opposite to the target movement direction 43 in the target earth unloading point 41 (41*a*) (step 401).

Initially, the distance from the rear end of the vehicle body to the center of the rear shaft of the unmanned vehicle, as shown in FIGS. 6A, 6B, is taken as a measure of the prescribed quantity for drawing out the earth unloading point. By drawing out the earth unloading point through the prescribed quantity, it is possible to set the earth unloading point in the position in which the unmanned vehicle 10 will never interfere with an area 61 of the hopper pit 40.

The processing of drawing out the earth unloading point in the direction of withdrawing from the hopper pit 40 that is opposite to the target movement direction 43 in the target earth unloading point 41 (41*a*) by the prescribed quantities is then repeated till the unmanned vehicle 10 stops interfering with the area 61 of the hopper pit 40 (steps 402 through 406). The prescribed quantity at this time is set to certain quantity (for example, 1 m) for absorbing the error.

Thus, it is determined whether or not the unmanned vehicle 10 interferes with the area 61 of the hopper pit 40 (step 403). This interference check is performed by using data on the dimensions of various body parts of the unmanned vehicle 10 and data on the position and shape of the hopper pit 40. When the interference was determined to be present based on the interference check results (step 404), the processing of withdrawing the earth unloading point through the prescribed quantity is further performed (step 405) and the processing flow returns to the processing from step 402. When the interference is determined to be absent based on the interference check results (step 404), the earth unloading point that was withdrawn up to this point in time is registered as the corrected target earth unloading point 42 and processing is completed.

Thus, a position obtained by shifting the target earth unloading point 41 in the direction of withdrawing from the hopper pit 40 that is the direction opposite to the target movement direction 43 to the position in which the body of the unmanned vehicle 10 does not interfere with the hopper pit 40 is found as a position of the corrected target earth unloading point 42. In this way, a state in which the unmanned vehicle 10 interferes with a partial area 61*a* of the hopper pit 40 when the unmanned vehicle is positioned in the target earth unloading point 41, as shown in FIG. 2A, can be changed to a state in which the unmanned vehicle 10 does not interfere with the hopper pit 40 when the unmanned vehicle is positioned in the corrected target earth unloading point 42 as shown in FIG. 2B.

The processing flow then moves to step 105 shown in FIG. 8A, and the area 61 of the hopper pit 40 is created as a hopper detour area 60 in which interference with the unmanned vehicle 10 is prohibited (see FIG. 2B). A corrected traveling course 70' is then created based on the hopper detour area 60, the corrected target earth unloading point 42, and the target movement direction 43 in the target earth unloading point 41, this course being such that the unmanned vehicle 10 is guided to travel so that the unmanned vehicle 10 advances in the target movement direction 43 toward the corrected target earth unloading point 42, without interfering with the hopper detour area 60 (see FIG. 2B). Further, a route 72 from the position of the corrected target earth unloading point 42 to the position of the target earth unloading point 41 is also created (step 105; see FIG. 2B). The data including these corrected traveling course 70' and route 72 are saved as data on the traveling course 70. The traveling course 70 is saved in association with the target earth unloading point 41 (step 106).

Where a course request from the unmanned vehicle 10 to the control station 20 is present (step 107), the registered target earth unloading point 41 is designated as an earth unloading point toward which the unmanned vehicle 10 has to be directed (step 108), the traveling course 70 corresponding to this designated target earth unloading point 41 is read out, and data on this traveling course 70 are transmitted to the unmanned vehicle 10 (step 109).

As a result, the unmanned vehicle 10 is guided to travel along the traveling course 70 (step 110).

Thus, the unmanned vehicle 10 is first guided to travel along the corrected traveling course 70'. As a result, the unmanned vehicle 10 detours the hopper detour area 60 (area 61 of the hopper pit 40) and advances in the target movement direction 43 to the corrected target earth unloading point 42.

The unmanned vehicle 10 is then guided to travel along the route 72 from the target position of the corrected target earth unloading point 42 to the target position of the target earth unloading point 41. As a result, the unmanned vehicle 10 advances in the target movement direction 43 to the target position of the target earth unloading point 41 and stops in the target earth unloading point 41. The load-carrying platform 10*b* of the unmanned vehicle 10 is then tilted (dumping operation is initiated) and the earth located in the load-carrying platform 10*b* is dropped into the hopper pit 40. The unmanned vehicle 10 that completed the earth unloading operation again travels forward from the target earth unloading point 41 along the traveling course 70 and is guided to travel to the earth unloading site outlet 50*b*.

The processing of FIG. 8B is identical to the above-described processing of FIG. 8A, except that the operation of creating a traveling course after receiving the course request is omitted.

Thus, in the control station 20, first, topographic data on the earth unloading site 50 are inputted (step 301), and then the teaching operation is performed and teaching data on the target earth unloading point 41 (41*a*) of the hopper pit 40 are registered (step 302; steps 201, 202 of FIG. 9A).

Where a course request from the unmanned vehicle 10 to the control station 20 is present (step 303), the registered target earth unloading point 41 is designated as an earth unloading point toward which the unmanned vehicle 10 has to be directed (step 304).

In the control station 20, an instruction is issued to generate the traveling course toward the designated target earth unloading point 41.

First, the target earth unloading point 41 (41*a*) is corrected, and a corrected target earth unloading point 42 that is drawn out to the position in which the body of the unmanned vehicle 10 does not interfere with the hopper pit 40 is found (step 305; steps 401 to 406 in FIG. 9B).

Then, the area 61 of the hopper pit 40 is created as the hopper detour area 60 in which interference with the unmanned vehicle 10 is prohibited (see FIG. 2B). A corrected traveling course 70' is then created based on the hopper detour area 60, the corrected target earth unloading point 42, and the target movement direction 43 in the target earth unloading point 41, this course being such that the unmanned vehicle 10 is guided to travel so that the unmanned vehicle 10 advances in the target movement direction 43 toward the corrected target earth unloading point 42, without interfering with the hopper detour area 60 (see FIG. 2B). Further, a route 72 from the position of the corrected target earth unloading point 42 to the position of the target earth unloading point 41 is also created (step 306; see FIG. 2B).

The data including these corrected traveling course 70' and route 72 are then transmitted as data on the traveling course 70 to the unmanned vehicle 10 (step 307).

As a result, the unmanned vehicle 10 is guided to travel along the traveling course 70 (step 308).

Thus, the unmanned vehicle 10 is first guided to travel along the corrected traveling course 70'. As a result, the unmanned vehicle 10 detours the hopper detour area 60 (area 61 of the hopper pit 40) and advances in the target movement direction 43 to the corrected target earth unloading point 42.

The unmanned vehicle 10 is then guided to travel along the route 72 from the corrected target earth unloading point 42 to the target earth unloading point 41. As a result, the unmanned vehicle 10 advances in the target movement direction 43 to the target position of the target earth unloading point 41 and stops in the target earth unloading point 41. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41 along the traveling course 70 and is guided to travel to the earth unloading site outlet 50b.

As described above, with the first embodiment, where data (target position, target movement direction) on the target earth unloading point 41 are acquired, it is possible to detour the hopper detour area 60 and freely set the traveling course 70 to the target earth unloading point 41. Therefore, when the traveling course 70 is taught, it is possible to create the traveling course 70 by teaching only the target earth unloading point 41, without actually traveling through all the passage points of the traveling course 70, prior to the guided travel. As a result, the efficiency of teaching operation is increased and operation efficiency is improved.

Further, when the unmanned vehicle 10 is guided to travel along the created traveling course 70, the unmanned vehicle 10 reaches the target earth unloading point 41 (point of interference with the hopper pit 40) of the hopper pit 40, while detouring the hopper detour area 60 (hopper pit 40). Therefore, the unmanned vehicle 10 can reach the target earth unloading point 41 of the hopper pit 40 with good accuracy, without interfering with the hopper pit 40 during traveling.

Second Embodiment

Similarly to the first embodiment, the second embodiment is also applied to the case in which one target earth unloading point 41 (for example) is registered around the hopper pit 40 within the earth unloading site 50. Alternatively, the second embodiment is applied to the case where, even if a plurality of target earth unloading points 41a, 41b, 41c are registered around the hopper pit 40 of the earth unloading site 50, a plurality of unmanned vehicles 10, 10', 10" are rarely guided to travel in almost the same interval to the earth unloading points 41a, 41b, 41c of the same hopper pit 40, and to the case where the unmanned vehicle 10 is rarely guided to travel to the hopper pit 40, while other unmanned vehicles 10', 10" are being unloaded at the same hopper pit 40. Where other unmanned vehicles 10', 10' that were guided earlier are present in the vicinity of the hopper pit 40 when the unmanned vehicle 10 is guided toward the hopper pit 40, this being a rare occasion, the unmanned vehicle 10 that arrived later may wait till the leading unmanned vehicles 10', 10" complete the earth unloading operation and depart from the hopper pit 40. The present embodiment is applied to the case, where waiting is rare and the decrease in productivity caused by waiting is sufficiently small. For example, a technique similar to that of Conventional Technology 3 can be used to avoid interference with the unmanned vehicles 10', 10" that arrived earlier.

The second embodiment will be explained below with reference to FIGS. 3A, 3B, FIGS. 10A, 10B, FIGS. 11A to 11C, FIGS. 12A to 12C, FIGS. 13A to 13C, and FIGS. 14A to 14D.

Figure 12A:
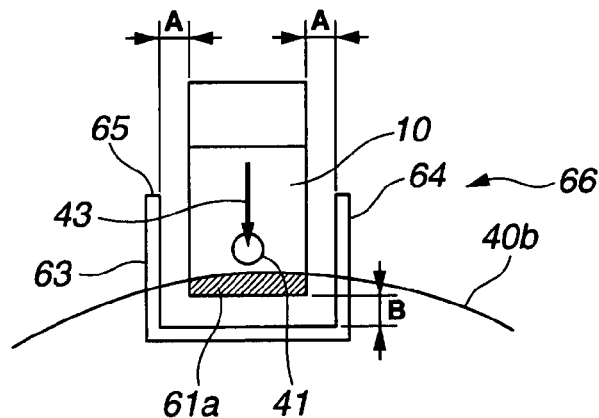
FIGS. 12A through 12C are explanatory drawings corresponding to FIG. 11A and illustrating the computation processing.
Figure 12B:
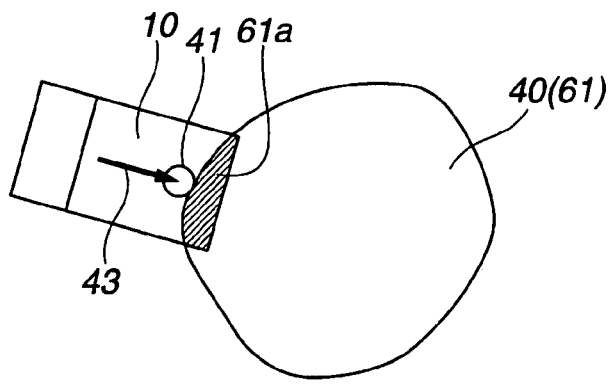
Figure 12C:
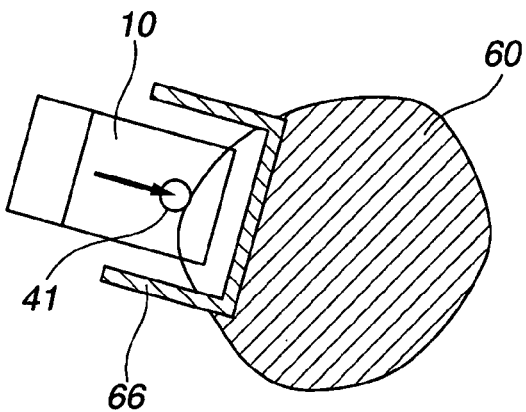

FIGS. 3A, 3B are top views of the area in the vicinity of the hopper pit 40 of the earth unloading site 50. FIG. 10A is a flowchart illustrating the processing sequence performed in the case where a traveling course 70 is generated in advance before a course request is obtained from the unmanned vehicle 10 and then the unmanned vehicle 10 is guided to travel along the traveling course 70. FIG. 10B is a flowchart illustrating the processing sequence performed in the case where a traveling course 70 is generated after a course request is obtained from the unmanned vehicle 10 and then the unmanned vehicle 10 is guided to travel along the traveling course 70. FIGS. 11A, 11B, 11C are flowcharts illustrating the processing sequences performed to find a hopper detour area. FIGS. 12A to 12C correspond to FIG. 11A and explain the computation processing procedure. Likewise, FIGS. 13A to 13B correspond to FIG. 11B and explain the computation processing procedure. Likewise, FIGS. 14A to 14D correspond to FIG. 11C and explain the computation processing procedure.

As shown in FIG. 10A, in the control station 20, first, the topographic data of the earth unloading site 50 are inputted (step 501), and then the teaching data of the earth unloading point 41 (41a) of the hopper pit 40 are registered (step 502; steps 201, 202 of FIG. 9A).

Then, an instruction to generate a traveling course is issued in the control station 20 (step 503).

First, as shown in FIG. 3B, a hopper detour area 60 (hatched portion) where the interference with the unmanned vehicle 10 is prohibited is created based on the target portion of the target earth unloading point 41, the target movement direction 43 in the target earth unloading point 41, data indicating the body width of the unmanned vehicle 10, and data indicating an area 61 of the hopper pit 40. For example, the following three methods can be used for finding the hopper detour area 60.

(First Method for Finding the Hopper Detour Area)

The first method will be explained with reference to FIG. 11A and FIGS. 12A to 12C.

As shown in FIG. 12B, when the unmanned vehicle 10 is positioned in the earth unloading point 41, the unmanned vehicle 10 interferes with the area 61 and partial area 61a of the hopper pit 40. Accordingly, as shown in FIG. 12A, a U-shaped pocket 66 is created that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43. Further, as shown in FIG. 12A, the distances A, B from the unmanned vehicle 10 to the inner side of the pocket 66 are set with consideration for position measurement accuracy, control accuracy, and the like, to values such that the unmanned vehicle 10 does not interfere with the pocket 66 even when the position measurement error and control error reach maximum (step 701).

An area obtained by adding the pocket 66 to the area 61 of the hopper pit 40 is then found, and the area (hatched portion) obtained by subtracting the inner area of the pocket 66 from this found area is taken as the hopper detour area 60 in which interference with the unmanned vehicle 10 is prohibited (step 702; see FIG. 12C).

(Second Method for Finding the Hopper Detour Area)

The second method will be explained with reference to FIG. 11B, FIG. 12A, and FIGS. 13A to 13C.

Figure 13A:
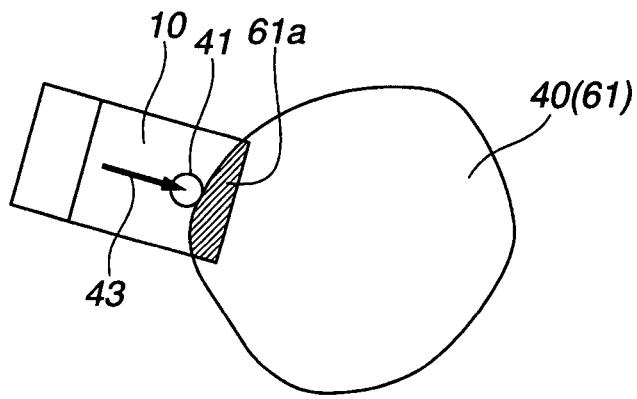
FIGS. 13A through 13C are explanatory drawings corresponding to FIG. 11B and illustrating the computation processing.

As shown in FIG. 13A, when the unmanned vehicle 10 is positioned in the earth unloading point 41, the unmanned vehicle 10 interferes with the area 61 and partial area 61a of the hopper pit 40. Accordingly, as shown in FIG. 12A, a pocket 66 is created that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43. (step 801).

Figure 13B:
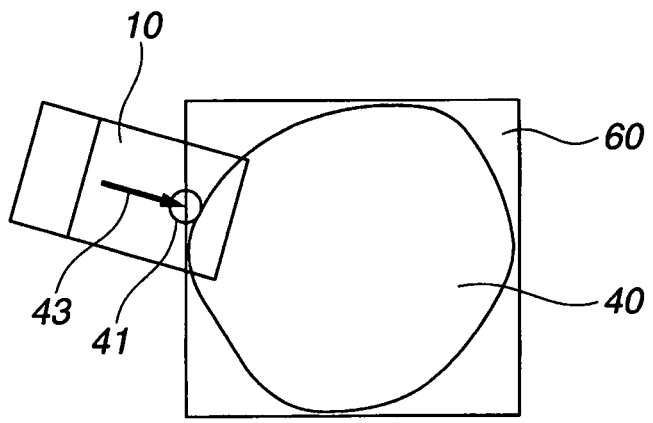

Further, as shown in FIG. 13B, a rectangular area that is in external contact with the hopper pit 40 is taken as an area 61' of the simplified hopper pit 40 (step 802).

Figure 13C:
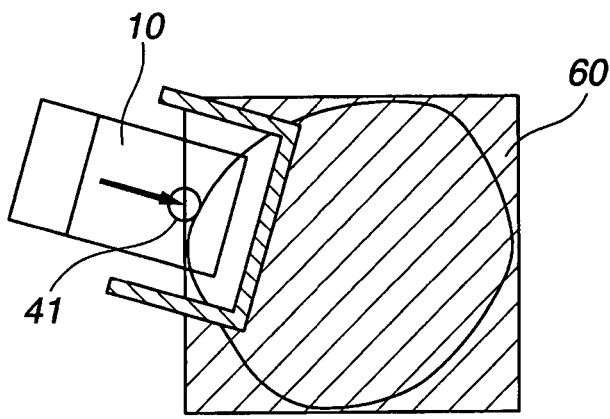

An area obtained by adding the pocket 66 to the area 61' of the simplified hopper pit 40 is then found, and the area (hatched portion) obtained by subtracting the inner area of the pocket 66 from this found area is taken as the hopper detour area 60 in which interference with the unmanned vehicle 10 is prohibited (step 803; see FIG. 13C).

(Third Method for Finding the Hopper Detour Area)

The third method will be explained with reference to FIG. 11C and FIGS. 14A to 14D.

Figure 14A:
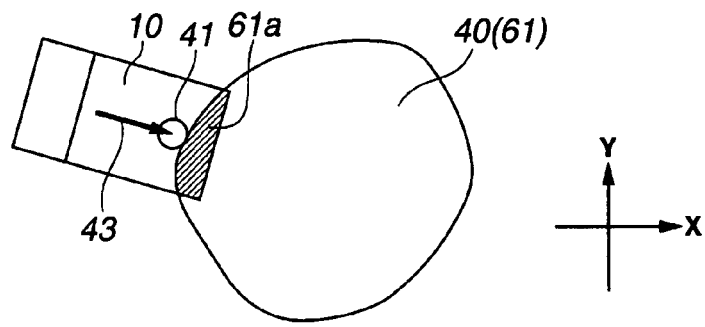
FIGS. 14A through 14D are explanatory drawings corresponding to FIG. 11C and illustrating the computation processing.

As shown in FIG. 14A, when the unmanned vehicle 10 is positioned in the earth unloading point 41, the unmanned vehicle 10 interferes with the area 61 and partial area 61a of the hopper pit 40. The coordinate axes of an X-Y coordinate system obtained when the hopper pit 40 is observed in an X-Y plane and the movement direction 43 in the earth unloading point 41 do not necessarily match.

Figure 14B:
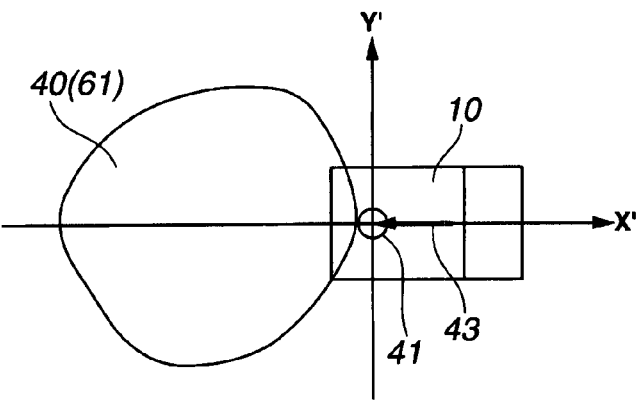

Accordingly, as shown in FIG. 14B, coordinate conversion is performed such that the movement direction 43 in the earth unloading point 41 matches a coordinate axis (for example, the X axis) of the X-Y coordinate system. The coordinate axes after the coordinate conversion are denoted by X', Y' (step 901).

Figure 14C:
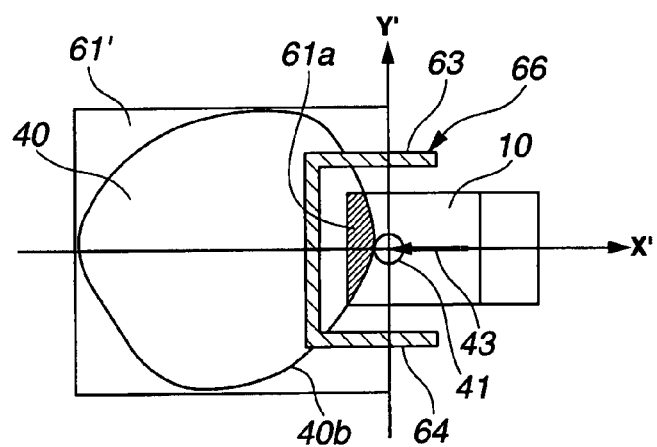

Further, as shown in FIG. 14C, a rectangular area that is in external contact with the hopper pit 40 is taken as an area 61' of the simplified hopper pit 40 (step 902).

Then, as shown in FIG. 14C, a pocket 66 is created that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43 (step 903).

Figure 14D:
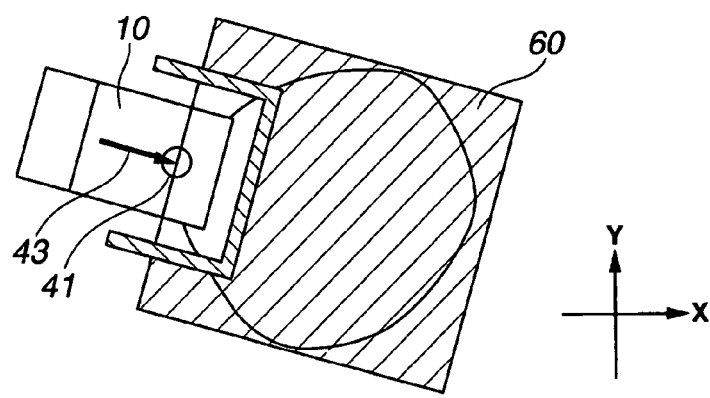

An area obtained by adding the pocket 66 to the area 61' of the simplified hopper pit 40 is then found, as shown in FIG. 14D, and the area (hatched portion) obtained by subtracting the inner area of the pocket 66 from this found area is taken as the hopper detour area 60 in which interference with the unmanned vehicle 10 is prohibited (step 904).

Then, as shown in FIG. 14D, the conversion of the coordinate system is performed, and the X'-Y' coordinate system is returned to the original X-Y coordinate system. (step 905).

As described hereinabove, a pocket 66 is found that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43, as shown in FIG. 3A, an area is found by adding the pocket 66 to the area 61 (or area 61') of the hopper pit 40, as shown in FIG. 3B, and the area (hatched portion) obtained by subtracting the inner area of the pocket 66 from this found area is found as the hopper detour area 60 in which interference with the unmanned vehicle 10 is prohibited (step 504).

Where the hopper detour area 60 is found by any of the above-described methods (step 504 in FIG. 10A), the processing flow then moves to step 505 in FIG. 10A and a traveling course 70 is created for guiding the unmanned vehicle 10 to travel based on the hopper detour area 60, the target position of the target earth unloading point 41, and the target movement direction 43 in the target earth unloading point 41, the traveling course being such that the unmanned vehicle 10 advances in the target movement direction 43 to the target earth unloading point 41, without interfering with the hopper detour area 60 (step 505). The traveling course 70 is saved in association with the target earth unloading point 41 (step 506).

Where a course request from the unmanned vehicle 10 to the control station 20 is present (step 507), the registered target earth unloading point 41 is designated as an earth unloading point toward which the unmanned vehicle 10 has to be directed (step 508), the traveling course 70 corresponding to this designated target earth unloading point 41 is read out, and data on this traveling course 70 are transmitted to the unmanned vehicle 10 (step 509).

As a result, the unmanned vehicle 10 is guided to travel along the traveling course 70 (step 510).

Thus, the unmanned vehicle 10 detours the hopper detour area 60 (the area obtained by subtracting the inner area of the pocket 66 from the area in which the area 61 (or 61') of the hopper pit 40 and the pocket 66 overlap), advances in the target movement direction 43 to the target position of the target earth unloading point 41, and stops in the target earth unloading point 41. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41 along the traveling course 70 and is guided to travel to the earth unloading site outlet 50b.

The processing of FIG. 10B is identical to the above-described processing of FIG. 10A, except that the operation of creating a traveling course after receiving the course request is omitted.

Thus, in the control station 20, first, topographic data on the earth unloading site 50 are inputted (step 601), and then the teaching operation is performed and teaching data on the earth unloading point 41 (41a) of the hopper pit 40 are registered (step 602; steps 201, 202 of FIG. 9A).

Where a course request from the unmanned vehicle 10 to the control station 20 is present (step 603), the registered target earth unloading point 41 is designated as an earth unloading point toward which the unmanned vehicle 10 has to be directed (step 604).

In the control station 20, an instruction is issued to generate the traveling course toward the designated target earth unloading point 41.

Accordingly, as described hereinabove, a pocket 66 is found that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43 (FIG. 3A), an area is found by adding the pocket 66 to the area 61 (or area 61') of the hopper pit 40, and the area (shown by hatching in FIG. 3B) obtained by subtracting the inner area of the pocket 66 from this found area is found as the hopper detour area 60 in which interference with the unmanned vehicle 10 is prohibited (step 604).

Then, a traveling course 70 is created for guiding the unmanned vehicle 10 to travel based on the hopper detour area 60 (the area obtained by subtracting the inner area of the pocket 66 from the area in which the area 61 (or 61') of the hopper pit 40 and the pocket 66 overlap), target position of the target earth unloading point 41, and target movement direction 43 in the target earth unloading point 41, the traveling course being such that the unmanned vehicle 10 advances in the target movement direction 43 to the target earth unloading point 41, without interfering with the hopper detour area 60 (step 606).

Then, data on the traveling course 70 are transmitted to the unmanned vehicle 10 (step 607).

As a result, the unmanned vehicle 10 is guided to travel along the traveling course 70 (step 608).

As a consequence, the unmanned vehicle 10 detours the hopper detour area 60 (the area obtained by subtracting the inner area of the pocket 66 from the area in which the area 61 (or 61') of the hopper pit 40 and the pocket 66 overlap), advances in the target movement direction 43 to the target position of the target earth unloading point 41, and stops in the target earth unloading point 41. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41 along the traveling course 70 and is guided to travel to the earth unloading site outlet 50b.

As described hereinabove, with the second embodiment, similarly to the first embodiment, acquiring data (target position, target movement direction) on the target earth unloading point 41 makes it possible to set freely the traveling course 70 for detouring the hopper detour area 60 and reaching the target earth unloading point 41. Therefore, when the traveling course 70 is taught, the traveling course 70 can be created by teaching only the target earth unloading point 41, without traveling through all the passage points of the traveling course 70, prior to the guided travel. As a result, the efficiency of teaching operation is increased and operation efficiency is increased.

Further, where the unmanned vehicle 10 is guided to travel along the created traveling course 70, the unmanned vehicle 10 reaches the target earth unloading point 41 (point inside the pocket 66) of the hopper pit 40, while detouring the hopper detour area 60 (an area obtained by subtracting the inner area of the pocket 66 from the area in which the area 61 (or 61') of the hopper pit 40 and the pocket 66 overlap). As a result, the unmanned vehicle 10 can reach the target earth unloading point 41 of the hopper pit 40 with good accuracy, without interfering with the hopper pit 40 during traveling.

Third Embodiment

The third embodiment applies to the case in which a plurality of target earth unloading points 41a, 41b, 41c are registered around a hopper pit 40 in an earth unloading site 50. This embodiment also applies to the case in which a plurality of unmanned vehicles 10, 10', 10" are guided to travel in almost the same interval to respective earth unloading points 41a, 41b, 41c of the same hopper pit 40, or the case in which the unmanned vehicle 10 is guided to travel to the hopper pit 40, while other unmanned vehicles 10', 10" are performing the earth unloading operation at the same hopper pit 40. Thus, this embodiment applies to the case in which interference with other unmanned vehicles 10', 10" in the vicinity of the hopper pit 40 has to be taken into account when the unmanned vehicle 10 is directed toward the hopper pit 40.

The third embodiment will be explained with reference to FIG. 15 and FIGS. 4A, 4B.

FIG. 4A is a top view of the earth unloading site 50. FIG. 4B shows a hopper detour area (hatched portion) 60 in the present embodiment. FIG. 15 is a flowchart illustrating the processing sequence in the case where the unmanned vehicle 10 is guided to travel along the traveling course 70 after the traveling course 70 has been created in advance prior to receiving the course request from the unmanned vehicle 10.

Figure 15:
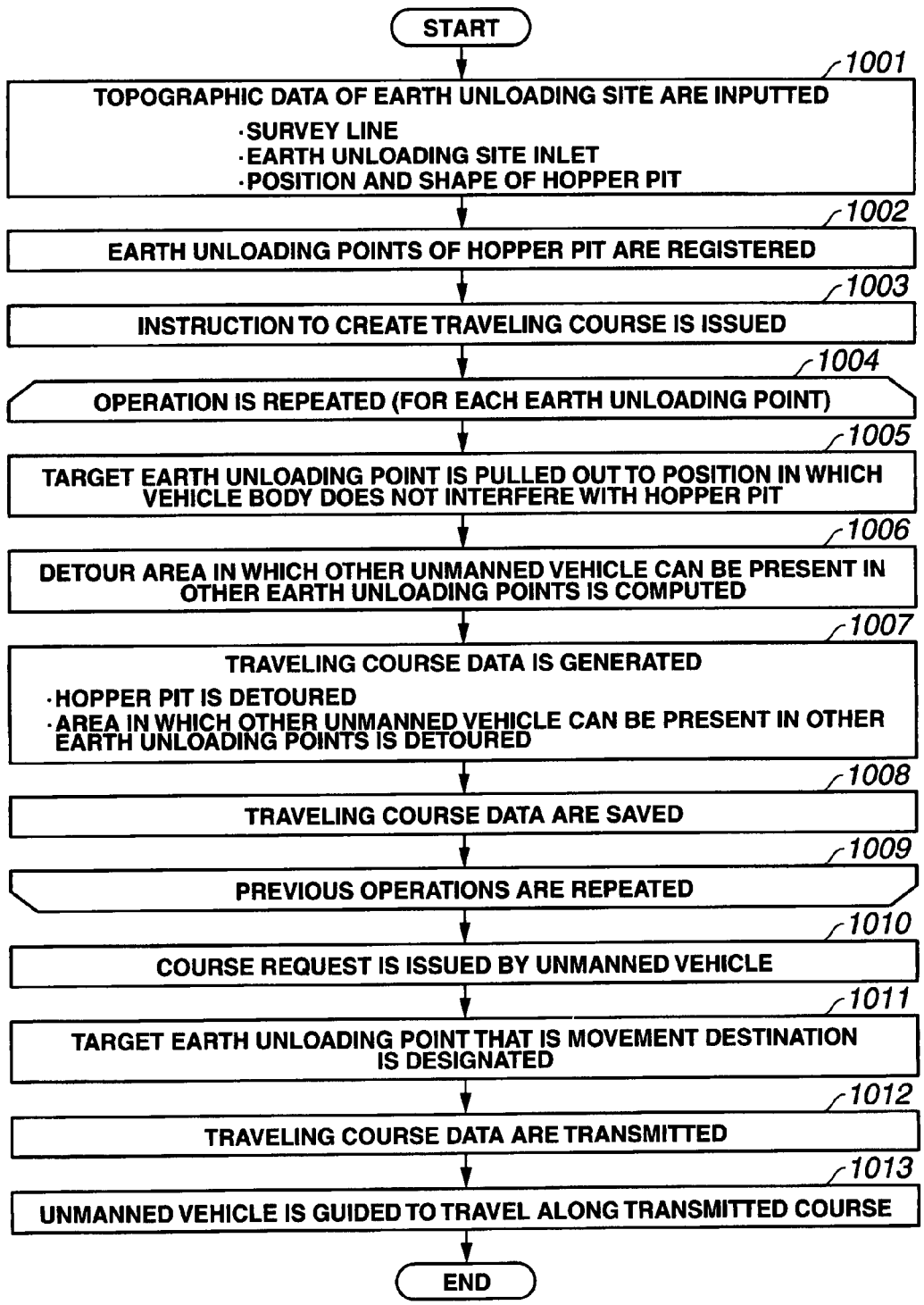
FIG. 15 is a flowchart of the processing sequence of the third embodiment.

As shown in FIG. 15, in the control and management station 20, first, the topographic data of the earth unloading site 50 are inputted (step 1001), and then the teaching operation is performed and teaching data of a plurality of earth unloading points 41a, 41b, 41c of the hopper pit 40 are registered, as shown in FIG. 4A (step 1002; see processing of steps 201, 202 of FIG. 9A).

Then, an instruction to generate a traveling course is issued in the control station 20 (step 1003).

The traveling course is created successively for the target earth unloading points 41a, 41b, 41c. First, the initial target earth unloading point 41a is selected, and data on the traveling course 70 that passes through this target earth unloading point 41a are created (steps 1004 to 1009).

The target earth unloading point 41a is then corrected and a corrected target earth unloading point 42 that is drawn out to the position in which the body of the unmanned vehicle 10 does not interfere with the hopper pit 40 is found (step 1005; see steps 401 to 406 of FIG. 9B).

Then, as shown in FIG. 4A, areas 68, 69 in which other unmanned vehicles 10', 10" can be present in other earth unloading points 41b, 41c that are different from the target earth unloading point 41a that has been presently selected are computed. The areas 68, 69 are found, based on the vehicle body data of the unmanned vehicles 10', 10", as areas of a rectangular shape that is larger by the predetermined amounts in both the total length and the width than the unmanned vehicle.

Then, as shown in FIG. 4B, an area obtained by adding the areas 68, 69 in which other unmanned vehicles 10', 10" can be present in other earth unloading points 41b, 41c to the area 61 of the hopper pit 40 is taken as a hopper detour area 60 in which interference with the unmanned vehicle 10 directed toward the target earth unloading points 41a is prohibited (hatched portion in FIG. 4B). However, it is sometimes impossible, for example, because of a narrow area of the earth unloading site 50, not to pass through the areas 68, 69 in which other unmanned vehicles 10', 10" can be present in other target earth unloading position 41b, 41c. In such cases, similarly to the first invention, the area 61 of the hopper pit 40 shown in FIGS. 2A, 2B is taken as the hopper detour area 60 in which interference with the unmanned vehicle 10 is prohibited (step 1006).

Then, a corrected traveling course 70' for guiding the unmanned vehicle 10 to travel such that the unmanned vehicle 10 moves in the target movement direction 43 to the corrected target earth unloading position 42, without interfering with the hopper detour area 60, is created based on the hopper detour area 60, the corrected target earth unloading position 42, and the target movement direction 43 in the target earth unloading position 41a (see FIG. 4A). Further, a route 72 from the position of the corrected target earth unloading point 42 to the position of the target earth unloading point 41a is also created (step 1007; see FIG. 4A). The data including these corrected traveling course 70' and route 72 are saved as data on the traveling course 70. The traveling course 70 is saved in association with the target earth unloading point 41a (step 1008).

Similar processing is then performed repeatedly with respect to all registered earth unloading points (steps 1004, 1009).

Thus, the next target earth unloading point 41b is selected, a hopper detour area 60 corresponding to this selected target earth unloading point 41b, that is, the hopper detour area 60 obtained by adding an area in which other unmanned vehicles 10, 10" can be present in other earth unloading points 41a, 41c to the area 61 of the hopper pit 40, is created, a corrected traveling course 73' corresponding to the target earth unloading point 41b is created based on the hopper detour area 60, and a traveling course 73 including the corrected traveling course 73' is saved in association with the target earth unloading point 41b (steps 1004 to 1009; see FIG. 4A). Likewise, the next target earth unloading point 41c is selected, a hopper detour area 60 corresponding to this selected target earth unloading point 41c, that is, the hopper detour area 60 obtained by adding an area in which other unmanned vehicles 10, 10' can be present in other earth unloading points 41a, 41b to the area 61 of the hopper pit 40, is created, a corrected traveling course 74' corresponding to the target earth unloading point 41c is created based on the hopper detour area 60, and a traveling course 74 including the corrected traveling course 74' is saved in association with the target earth unloading point 41c (steps 1004 to 1009; see FIG. 4A).

Where a course request from the unmanned vehicle 10 to the control station 20 is present (step 1010), the optimum target earth unloading point (for example, the target earth unloading point 41a) is designated, from among all the registered target earth unloading points 41a, 41b, 41c, as an earth unloading point toward which the unmanned vehicle 10 has to be directed (step 1011), the traveling course 70 corresponding to this designated target earth unloading point 41a is read out, and data on this traveling course 70 are transmitted to the unmanned vehicle 10 that is the course request source (step 1012).

As a result, the unmanned vehicle 10 is guided to travel along the traveling course 70 (step 1013).

Thus, the unmanned vehicle 10 is first guided to travel along the corrected traveling course 70'. As a result, the unmanned vehicle 10 detours the hopper detour area 60 (area 61 of the hopper pit 40 and areas 68, 69 in which other unmanned vehicles 10', 10" can be present in other target earth unloading position 41b, 41c) and advances in the target movement direction 43 to the corrected target earth unloading point 42.

The unmanned vehicle 10 is then guided to travel along the route 72 from the target position of the corrected target earth unloading point 42 to the target position of the target earth unloading point 41a. As a result, the unmanned vehicle 10 advances in the target movement direction 43 to the target position of the target earth unloading point 41a and stops in the target earth unloading point 41a. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41a along the traveling course 70 and is guided to travel to the earth unloading site outlet 50b.

In the case where a course is created in which the unmanned vehicle has to pass through the areas 68, 69, the unmanned vehicle 10 reaches the target earth unloading point 41a (a point of interference with the hopper pit 40) of the hopper pit 40, while detouring at least the area 61 of the hopper pit 40. However, in this case, if the unmanned vehicle 10 travels without stopping, it sometimes interferes with the leading unmanned vehicles 10', 10". Therefore, the unmanned vehicle may be caused to pass through the areas 68, 69 where the aforementioned other unmanned vehicles 10', 10" can be present, after the leading unmanned vehicles 10', 10" have completed the earth unloading operation in the hopper pit 40 and have departed from the hopper pit 40, for example, by using a procedure similar to that of the Conventional Technology 3.

Thus, the effect obtained in the third embodiment is identical to that of the first embodiment.

Further, with the third embodiment, where the unmanned vehicle 10 is guided to travel along the created traveling course 70, the unmanned vehicle 10 reaches the target earth unloading point 41a (a point of interference with the hopper pit 40) of the hopper pit 40, while detouring the hopper detour area 60 (hopper pit 40 and other unmanned vehicles 10', 10") including the area where other unmanned vehicles 10', 10" can be present. Further, only when the unmanned vehicle 10 has to pass through the areas 68, 69, the unmanned vehicle may wait till the leading unmanned vehicles 10', 10" depart therefrom. Therefore, when a plurality of unmanned vehicles 10, 10', 10" are guided to travel in almost the same interval to the same hopper pit 40, or when the unmanned vehicle 10 is guided to travel to the hopper pit 40 while other unmanned vehicles 10', 10" are performing the earth unloading operation in the same hopper pit 40, the unmanned vehicle can reach the target earth unloading point 41a with good accuracy and with a minimum waiting time, while reliably preventing interference between the unmanned vehicles in the vicinity of hopper pit 40.

Fourth Embodiment

Figure 16:
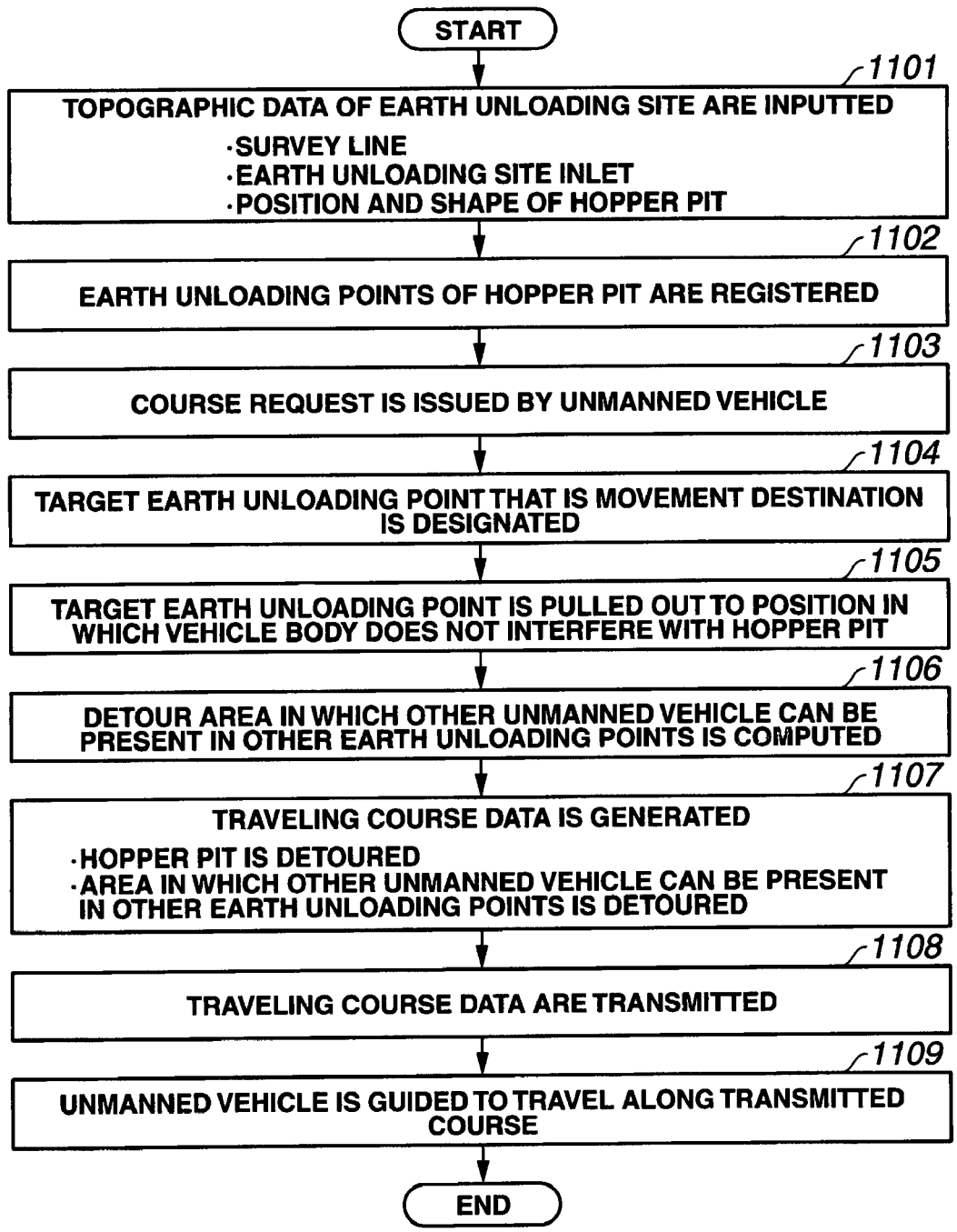
FIG. 16 is a flowchart of the processing sequence of the fourth embodiment.

The processing of the fourth embodiment is illustrated by FIG. 16. The processing of the fourth embodiment is identical to that of the above-described third embodiment (FIG. 15), except that the traveling course is created after the presence of other unmanned vehicles in other earth unloading points has been determined upon receiving a course request.

Thus, in the control station 20, first, the topographic data of the earth unloading site 50 are inputted (step 1101), and then the teaching operation is performed, and the teaching data of a plurality of target earth unloading points 41a, 41b, 41c located around the hopper pit 40 are registered as shown in FIG. 4A (step 1102; see processing of steps 201, 202 in FIG. 9A).

Where a course request from the unmanned vehicle 10 to the control station 20 is present (step 1103), the optimum target earth unloading point (for example, the target earth unloading point 41a) is designated, from among all the registered target earth unloading points 41a, 41b, 41c, as an earth unloading point toward which the unmanned vehicle 10 has to be directed (step 1104).

In the control station 20, an instruction is issued to generate the traveling course toward the designated target earth unloading point 41a.

First, the designated target earth unloading point 41a is corrected, and a corrected target earth unloading point 42 that is drawn out to the position in which the body of the unmanned vehicle 10 does not interfere with the hopper pit 40 is found (step 1105; see steps 401 to 406 in FIG. 9B).

Then, as shown in FIG. 4A, it is determined whether the unmanned vehicles 10', 10" are present in the other earth unloading points 41b, 41c that are different from the designated target earth unloading point 41a. This determination is performed based on the successive position data of unmanned vehicles 10', 10" that are transmitted from the unmanned vehicles 10', 10" to the control station 20.

As a result, where the other unmanned vehicles 10', 10" are determined to be present in, or move toward the other target earth unloading positions 41b, 41c, the area (hatched area in FIG. 4B) obtained by adding the areas 68, 69 in which the other unmanned vehicles 10', 10" can be present in the other target earth unloading positions 41b, 41c to the area 61 of the hopper pit 40 is created as a hopper detour area 60 in which interference with the unmanned vehicle 10 is prohibited.

Where one other unmanned vehicle (for example, the unmanned vehicle 10') is determined to be present in, or move toward the other target earth unloading position 41b, the area obtained by adding the area 68 in which the other unmanned vehicle 10' can be present in the other target earth unloading position 41b to the area 61 of the hopper pit 40 is created as a hopper detour area 60 in which interference with the unmanned vehicle 10 is prohibited.

However, it is sometimes impossible, for example, because of a narrow area of the earth unloading site 50, not to pass through the areas 68, 69 even when other unmanned vehicles 10', 10" are present in other target earth unloading position 41b, 41c or move toward the other target earth unloading position 41b, 41c. In such cases, the aforementioned areas 68, 69 can be passed after the leading other unmanned vehicles 10', 10" have completed the earth unloading operation and departed from the hopper pit 40. Therefore, in this case, similarly to the first invention, the area 61 of the hopper pit 40 shown in FIGS. 2A, 2B is taken as the hopper detour area 60 in which interference with the unmanned vehicle 10 is prohibited.

Where the determination results are such that the other unmanned vehicles 10', 10" are not determined to be present in, or move toward the other target earth unloading positions 41b, 41c, only the area 61 of the hopper pit 40 is taken into account and the presence of other unmanned vehicles 10', 10" is ignored. Thus, the area 61 of the hopper pit 40 is set as the hopper detour area 60 (step 1106).

Then, a corrected traveling course 70' for guiding the unmanned vehicle 10 to travel such that the unmanned vehicle 10 moves in the target movement direction 43 to the corrected target earth unloading position 42, without interfering with the hopper detour area 60, is created based on the hopper detour area 60, the corrected target earth unloading position 42, and the target movement direction 43 in the target earth unloading position 41a (see FIG. 4A). Further, a route 72 from the position of the corrected target earth unloading point 42 to the position of the target earth unloading point 41a is also created.

Where the determination results are such that the other unmanned vehicle 10' is not determined to be present in, or move toward the other target earth unloading positions 41b, the area 68 is not included in the hopper detour area 60. Therefore, as shown by a broken line in FIG. 4A, the traveling course 71 (corrected traveling course 71') such that passes in the vicinity of other earth unloading point 41b (a point in which the other unmanned vehicle 10', provided that it is present, would interfere) can be also set (step 1107; see FIG. 4A).

The data including these corrected traveling course 70' and route 72 are then transmitted as data on the traveling course 70 to the unmanned vehicle 10 (step 1108).

As a result, the unmanned vehicle 10 is guided to travel along the traveling course 70 (step 1109).

Thus, the unmanned vehicle 10 is first guided to travel along the corrected traveling course 70'. As a result, the unmanned vehicle 10 detours the hopper detour area 60 (area 61 of the hopper pit 40 and areas 68, 69 whether other unmanned vehicles 10', 10" can be present in other earth unloading points 41b, 41c) and advances in the target movement direction 43 to the corrected target earth unloading point 42.

The unmanned vehicle 10 is then guided to travel along the route 72 from the target position of the corrected target earth unloading point 42 to the target position of the target earth unloading point 41a. As a result, the unmanned vehicle 10 advances in the target movement direction 43 to the target position of the target earth unloading point 41a and stops in the target earth unloading point 41a. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41a along the traveling course 70 and is guided to travel to the earth unloading site outlet 50b.

When the unmanned vehicle has to pass through the areas 68, 69 even when other unmanned vehicles 10', 10" have been determined to be present in, or move toward the other target earth unloading points 41b, 41c, or when other unmanned vehicles 10', 10" are not determined to be present in, or move toward the other target earth unloading points 41b, 41c, the unmanned vehicle 10 reaches the target earth unloading point 41a of the hopper pit 40, while detouring at least the area 61 of the hopper pit 40. However, in the case where the leading other unmanned vehicles 10', 10" are present at the hopper pit 40 or move toward the hopper pit 40, if the unmanned vehicle 10 travels without stopping, it can interfere with the leading unmanned vehicles 10', 10". Therefore, the unmanned vehicle may be caused to pass through the areas 68, 69 where the aforementioned other unmanned vehicles 10', 10" can be present, after the leading unmanned vehicles 10', 10" have completed the earth unloading operation in the hopper pit 40 and have departed from the hopper pit 40, for example, by using a procedure similar to that of the Conventional Technology 3.

Thus, the effect obtained in the fourth embodiment is identical to that of the third embodiment.

Fifth Embodiment

The fifth embodiment applies to the case in which a plurality of target earth unloading points 41a, 41b, 41c are registered around a hopper pit 40 in an earth unloading site 50. This embodiment also applies to the case in which a plurality of unmanned vehicles 10, 10', 10" are guided to travel in almost the same interval to respective earth unloading points 41a, 41b, 41c of the same hopper pit 40, or the case in which the unmanned vehicle 10 is guided to travel to the hopper pit 40, while other unmanned vehicles 10', 10" are performing the earth unloading operation at the same hopper pit 40. Thus, this embodiment applies to the case in which interference with other unmanned vehicles 10', 10" in the vicinity of the hopper pit 40 has to be taken into account when the unmanned vehicle 10 is directed toward the hopper pit 40.

The fifth embodiment will be explained with reference to FIG. 17 and FIGS. 5A, 5B.

FIG. 5A is a top view of the earth unloading site 50. FIG. 5B shows a hopper detour area (hatched portion) in the present embodiment. FIG. 17 is a flowchart illustrating the processing sequence in the case where the unmanned vehicle 10 is guided to travel along the traveling course 70 after the traveling course 70 has been created in advance prior to receiving the course request from the unmanned vehicle 10.

Figure 17:
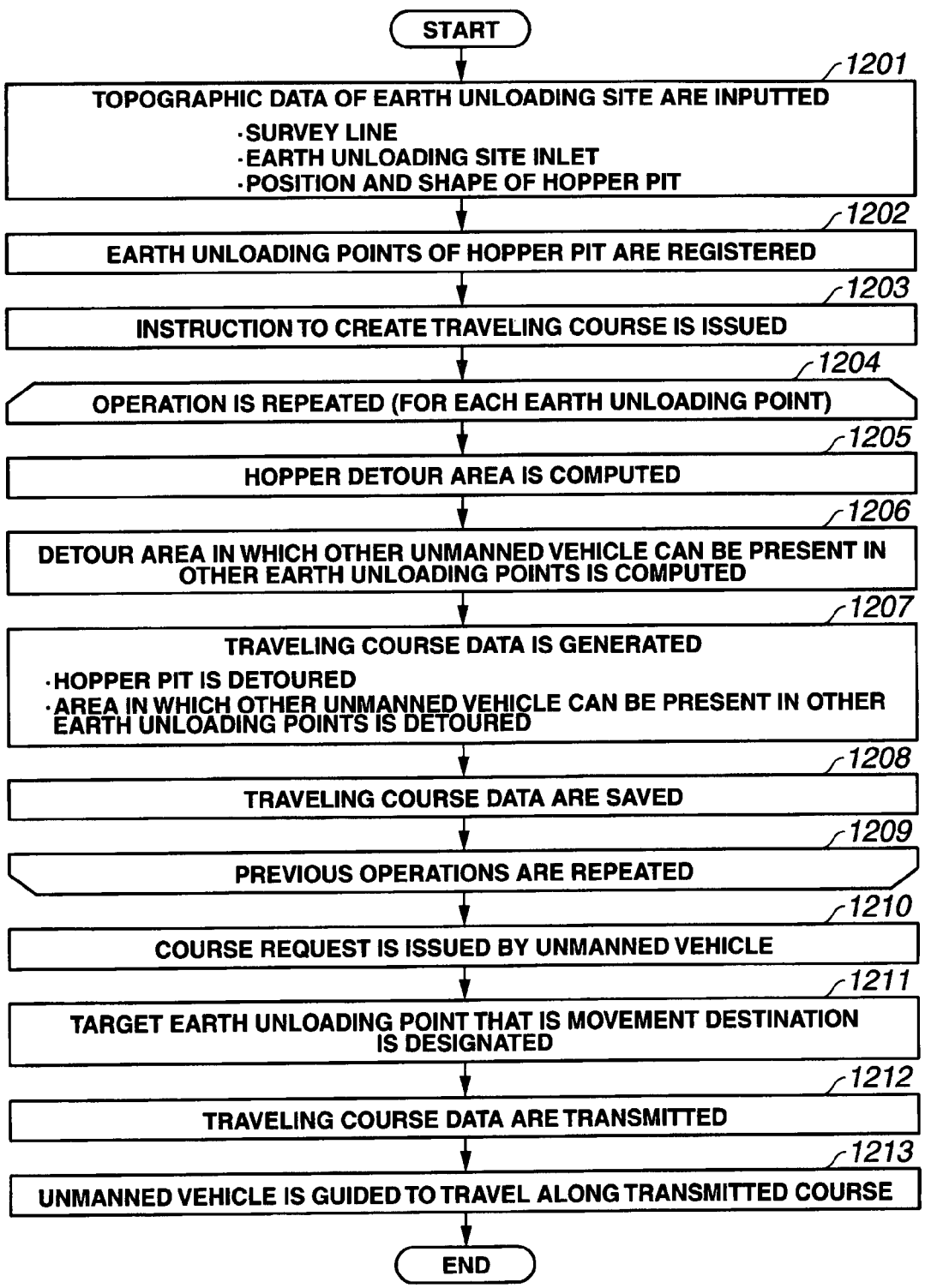
FIG. 17 is a flowchart of the processing sequence of the fifth embodiment.

As shown in FIG. 17, in the control and management station 20, first, the topographic data of the earth unloading site 50 are inputted (step 1201), and then the teaching operation is performed and teaching data of a plurality of earth unloading points 41a, 41b, 41c of the hopper pit 40 are registered, as shown in FIG. 5A (step 1202; see processing of steps 201, 202 of FIG. 9A).

Then, an instruction to generate a traveling course is issued in the control station 20 (step 1203).

The traveling course is created successively for the target earth unloading points 41a, 41b, 41c. First, the initial target earth unloading point 41a is selected, and data on the traveling course 70 that passes through this target earth unloading point 41a are created (steps 1204 to 1209).

First, a pocket 66 corresponding to the selected target earth unloading point 41a is created. Thus, a pocket 66 is found that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43 (FIG. 5A), and an area obtained by adding the pocket 66 to the area 61' (or the area 61) of the hopper pit 40 is found (step 1205).

Then, as shown in FIG. 5A, areas 68, 69 in which other unmanned vehicles 10', 10" can be present in other earth unloading points 41b, 41c that are different from the target earth unloading point 41a that has been presently selected are computed.

Then, as shown in FIG. 5B, an area obtained by adding the areas 68, 69 in which other unmanned vehicles 10', 10" can be present in other earth unloading points 41b, 41c to the area obtained by adding the pocket 66 to the area 61' (or the area 61) of the hopper pit 40 is found, and an area obtained by subtracting the inner area of the pocket 66 from this found area is taken as a hopper detour area 60 in which interference with the unmanned vehicle 10 directed toward the target earth unloading points 41a is prohibited (hatched portion in FIG. 5B). However, it is sometimes impossible, for example, because of a narrow area of the earth unloading site 50, not to pass through the areas 68, 69 in which other unmanned vehicles 10', 10" can be present in other target earth unloading position 41b, 41c. In such cases, similarly to the second invention, the area shown by hatching in FIGS. 3A, 3B is taken as the hopper detour area 60 in which interference with the unmanned vehicle 10 is prohibited (step 1206).

Then, a traveling course 70 for guiding the unmanned vehicle 10 to travel such that the unmanned vehicle 10 moves in the target movement direction 43 to the corrected target earth unloading position 41a, without interfering with the hopper detour area 60, is created based on the hopper detour area 60 (the area obtained by subtracting the inner area of the pocket 66 from the area in which the area 61' (or 61) of the hopper pit 40, the area of pocket 66, and the area in which other unmanned vehicles 10', 10" can be present in other earth unloading points 41b, 41c overlap), the target position of the target earth unloading point 41a, and the target movement direction 43 in the target earth unloading point 41a (step 1207).

The traveling course 70 is saved in association with the target earth unloading point 41a (step 1208).

Similar processing is then performed repeatedly with respect to all the registered earth unloading points, and traveling courses 70, 73, 74 are created for each target earth unloading point 41a, 41b, 41c and saved (steps 1204 to 1209).

Where a course request from the unmanned vehicle 10 to the control station 20 is present (step 1210), the optimum target earth unloading point (for example, the target earth unloading point 41a) is designated, from among all the registered target earth unloading points 41a, 41b, 41c, as an earth unloading point toward which the unmanned vehicle 10 has to be directed (step 1211), the traveling course 70 corresponding to this designated target earth unloading point 41a is read out, and data on this traveling course 70 are transmitted to the unmanned vehicle 10 (step 1212).

As a result, the unmanned vehicle 10 is guided to travel along the traveling course 70 (step 1213).

Thus, the unmanned vehicle 10 detours the hopper detour area 60 (the area obtained by subtracting the inner area of the pocket 66 from the area in which the area 61' (or 61) of the hopper pit 40, the area of pocket 66, and the area in which other unmanned vehicles 10', 10" can be present in other earth unloading points 41b, 41c overlap), advances in the target movement direction 43 toward the target position of the target earth unloading point 41a, and stops in the target earth unloading point 41a. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41a along the traveling course 70 and is guided to travel to the earth unloading site outlet 50b.

In the case where a course is created in which the unmanned vehicle has to pass through the areas 68, 69, the unmanned vehicle 10 reaches the target earth unloading point 41a of the hopper pit 40, while detouring at least the hopper detour area 60 shown by a hatched portion in FIG. 3B. However, in this case, if the unmanned vehicle 10 travels without stopping, it sometimes interferes with the leading unmanned vehicles 10', 10". Therefore, the unmanned vehicle may be caused to pass through the areas 68, 69 where the aforementioned other unmanned vehicles 10', 10" can be present, after the leading unmanned vehicles 10', 10" have completed the earth unloading operation in the hopper pit 40 and have departed from the hopper pit 40, for example, by using a procedure similar to that of the Conventional Technology 3.

Thus, the effect obtained in the fifth embodiment is identical to that of the third embodiment.

Sixth Embodiment

Figure 18:
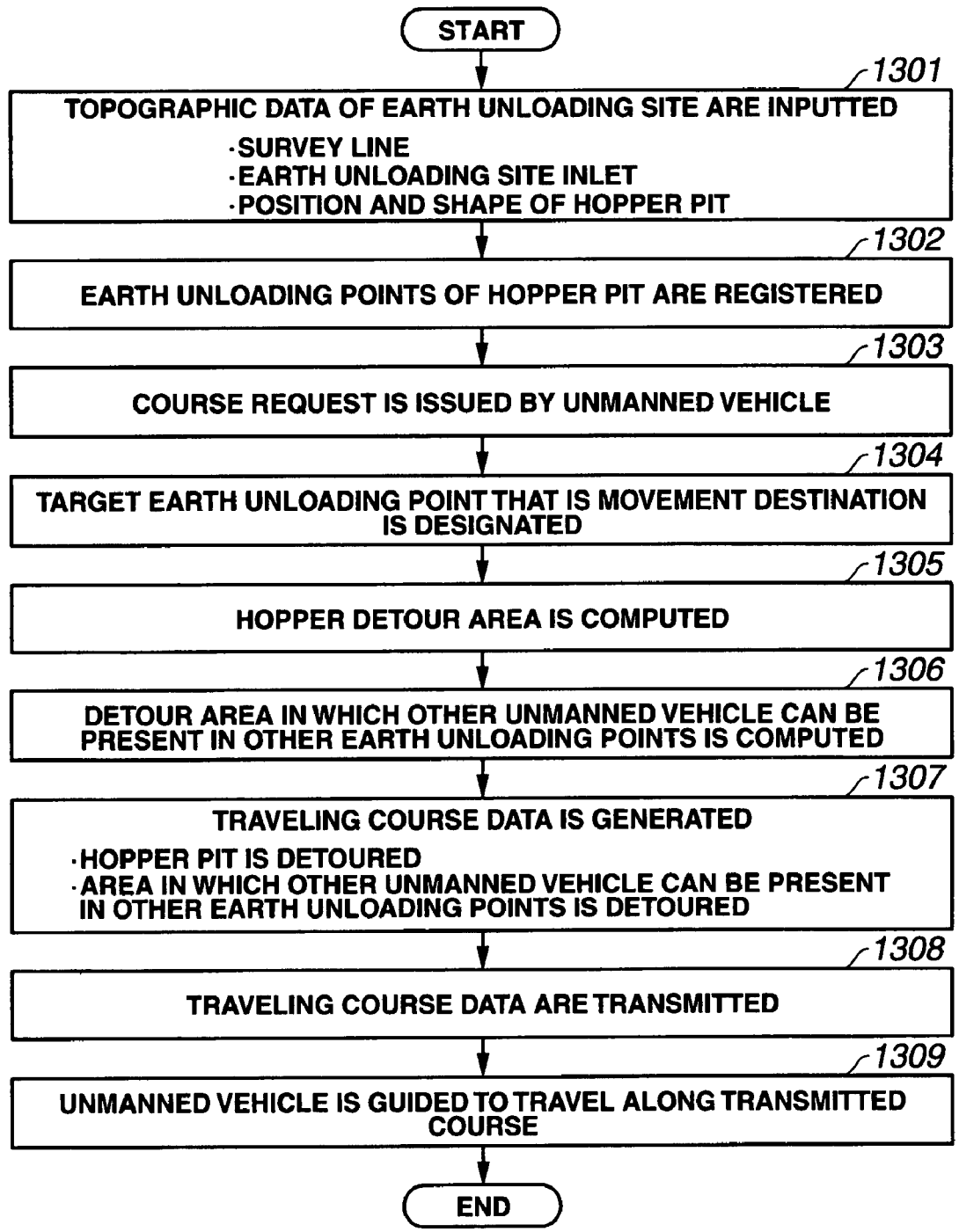
FIG. 18 is a flowchart of the processing sequence of the sixth embodiment.

The processing of the sixth embodiment is illustrated by FIG. 18. The processing of the sixth embodiment is identical to that of the above-described fifth embodiment (FIG. 17), except that the traveling course is created after the presence of other unmanned vehicles in other earth unloading points has been determined upon receiving a course request.

Thus, in the control station 20, first, the topographic data of the earth unloading site 50 are inputted (step 1301), and then the teaching operation is performed, and the teaching data of a plurality of target earth unloading points 41a, 41b, 41c located around the hopper pit 40 are registered as shown in FIG. 5A (step 1302; see processing of steps 201, 202 in FIG. 9A).

Where a course request from the unmanned vehicle 10 to the control station 20 is present (step 1303), the optimum target earth unloading point (for example, the target earth unloading point 41a) is designated, from among all the registered target earth unloading points 41a, 41b, 41c, as an earth unloading point toward which the unmanned vehicle 10 has to be directed (step 1304).

In the control station 20, an instruction is issued to generate the traveling course toward the designated target earth unloading point 41a.

First, a pocket 66 corresponding to the selected target earth unloading point 41a is created. Thus, a pocket 66 is found that has an opening 65 into which the unmanned vehicle 10 enters, contains inside thereof the area 61a in which the vehicle body interferes with the hopper pit 40, and comprises two guard portions 63, 64 that protrude outward from an edge 40b of the hopper pit 40 in the direction opposite to the target movement direction 43 (FIG. 5A), and an area obtained by adding the pocket 66 to the area 61' (or the area 61) of the hopper pit 40 is found (step 1305).

Then, as shown in FIG. 5A, it is determined whether the unmanned vehicles 10', 10" are present in other earth unloading points 41b, 41c that are different from the designated target earth unloading point 41a. As a result, where the other unmanned vehicles 10', 10" are determined to be present in, or move toward the other target earth unloading positions 41b, 41c, an area obtained by adding the areas 68, 69 in which the other unmanned vehicles 10', 10" can be present in the other target earth unloading positions 41b, 41c to the area obtained by adding the pocket 66 to the area 61' (or the area 61) of the hopper pit 40 is found, and an area obtained by subtracting the inner region of the pocket 66 from the found area is taken as a hopper detour area 60 (hatched area in FIG. 5B) in which interference with the unmanned vehicle 10 directed toward the target earth unloading point 41a is prohibited.

Where one other unmanned vehicle (for example, the unmanned vehicle 10') is determined to be present in, or move toward the other target earth unloading position 41b, the area obtained by adding the area 68 in which the other unmanned vehicle 10' can be present in the other target earth unloading position 41b to the area obtained by adding the pocket 66 to the area 61' (or the area 61) of the hopper pit 40 is found, and the area obtained by subtracting the inner region of the pocket 66 from the found area is taken as the hopper detour area 60.

However, it is sometimes impossible, for example, because of a narrow area of the earth unloading site 50, not to pass through the areas 68, 69 even when other unmanned vehicles 10', 10" are present in other target earth unloading position 41b, 41c or move toward the other target earth unloading position 41b, 41c. In such cases, the aforementioned areas 68, 69 can be passed after the leading other unmanned vehicles 10', 10" have completed the earth unloading operation and departed from the hopper pit 40. Therefore, in this case, similarly to the second invention, the area shown by hatching in FIG. 3B, that is, the area (hatched portion in FIG. 3B) obtained by subtracting the inner area of the pocket 66 from the area obtained by adding the pocket 66 to the area 61' (or area 61) of the hopper pit 40 is taken as the hopper detour area 60 in which interference with the unmanned vehicle 10 is prohibited.

Where the determination results are such that the other unmanned vehicles 10', 10" are not determined to be present in, or move toward the other target earth unloading positions 41b, 41c, likewise, the area (hatched portion in FIG. 3B) obtained by subtracting the inner area of the pocket 66 from the area obtained by adding the pocket 66 to the area 61' (or area 61) of the hopper pit 40 is taken as the hopper detour area 60 (step 1306).

Then, a traveling course 70 is created for guiding the unmanned vehicle 10 to travel such that the unmanned vehicle 10 advances in the target movement direction 43 to the target earth unloading point 41a, without interfering with the hopper detour area 60, based on the hopper detour area 60, the target position of the target earth unloading point 41a, and the target movement direction 43 in the target earth unloading point 41a. Further, where the determination results are such that the other unmanned vehicle 10' is not determined to be present in, or move toward the other target earth unloading positions 41b, the area 68 is not included in the hopper detour area 60. Therefore, as shown by a broken line in FIG. 5A, the traveling course 71 (corrected traveling course 71') such that passes in the vicinity of other earth unloading point 41b (a point in which the other unmanned vehicle 10', provided that it is present, would interfere) can be also set (step 1307).

The data on this traveling course 70 are then transmitted to the unmanned vehicle 10 that issued the course request (step 1308).

As a result, the unmanned vehicle 10 is guided to travel along the traveling course 70 (step 1309). Thus, the unmanned vehicle 10 detours the hopper detour area 60 (the area obtained by subtracting the inner area of the pocket 66 from the area in which the area 61' (or 61) of the hopper pit 40, the area of pocket 66, and the area in which other unmanned vehicles 10', 10" can be present in other earth unloading points 41b, 41c overlap), advances in the target movement direction 43 toward the target position of the target earth unloading point 41a, and stops in the target earth unloading point 41a. The load-carrying platform 10b of the unmanned vehicle 10 is then tilted (dumping operation is initiated) and the earth located in the load-carrying platform 10b is dropped into the hopper pit 40. The unmanned vehicle 10 that completed the earth unloading operation again travels forward from the target earth unloading point 41a along the traveling course 70 and is guided to travel to the earth unloading site outlet 50b.

When the unmanned vehicle has to pass through the areas 68, 69 even when other unmanned vehicles 10', 10" have been determined to be present in, or move toward the other target earth unloading points 41b, 41c, or when other unmanned vehicles 10', 10" are not determined to be present in, or move toward the other target earth unloading points 41b, 41c, the unmanned vehicle 10 reaches the target earth unloading point 41a of the hopper pit 40, while detouring at least the hopper detour area 60 shown as a hatched portion in FIG. 3B. However, in the case where the leading other unmanned vehicles 10', 10" are present at the hopper pit 40 or move toward the hopper pit 40, if the unmanned vehicle 10 travels without stopping, it can interfere with the leading unmanned vehicles 10', 10". Therefore, the unmanned vehicle may be caused to pass through the areas 68, 69 where the aforementioned other unmanned vehicles 10', 10" can be present, after the leading unmanned vehicles 10', 10" have completed the earth unloading operation in the hopper pit 40 and have departed from the hopper pit 40, for example, by using a procedure similar to that of the Conventional Technology 3.

As described above, the effect obtained in the sixth embodiment is identical to that of the third embodiment.

In the present embodiment, the unmanned vehicle is caused by an operator to travel prior to the actual guided travel and teaching data on target earth unloading points are acquired, but it is also possible to acquire teaching data on target earth unloading points by measurements, without causing the unmanned vehicle to travel.

What is claimed is:

1. A guided travel control method for an unmanned vehicle by which the unmanned vehicle is guided to travel along a traveling course such that the unmanned vehicle moves in a target movement direction to a target earth unloading position of a hopper pit, and the unmanned vehicle is caused to perform an earth unloading operation in a state in which a vehicle body interferes with the hopper pit, comprising:

finding a position obtained by shifting the target earth unloading position in a direction of withdrawing from the hopper pit that is a direction opposite to the target movement direction, to a position in which the vehicle body does not interfere with the hopper pit, as a corrected target earth unloading position;

creating an area of the hopper pit as a hopper detour area in which interference with the unmanned vehicle is prohibited;

creating a corrected traveling course for guiding the unmanned vehicle to travel such that the unmanned vehicle moves in the target movement direction to the corrected target earth unloading position without interfering with the hopper detour area, based on the hopper detour area, the corrected target earth unloading position, and the target movement direction in the target earth unloading position;

guiding the unmanned vehicle to travel along the created corrected traveling course and causing the unmanned vehicle to move in the target movement direction to the corrected target earth unloading position; and further guiding the unmanned vehicle to travel along a route from the corrected target earth unloading position to the target earth unloading position and causing the unmanned vehicle to move in the target movement direction to the target earth unloading position.

2. A guided travel control method for an unmanned vehicle by which the unmanned vehicle is guided to travel along a traveling course such that the unmanned vehicle moves in a target movement direction to a target earth unloading position of a hopper pit, and the unmanned vehicle is caused to perform an earth unloading operation in a state in which a vehicle body interferes with the hopper pit, comprising:

finding two guard portions that have an opening into which the unmanned vehicle enters, contain inside thereof an area in which the vehicle body interferes with the hopper pit, and protrude outward from an edge of the hopper pit in a direction opposite to the target movement direction based on the target earth unloading position, the target movement direction in the target earth unloading position, data indicating a body width of the unmanned vehicle, and data indicating an area of the hopper pit, and creating an area obtained by subtracting an inner area of the two guards from an area obtained by adding the two guards to the area of the hopper pit as a hopper detour area in which interference with the unmanned vehicle is prohibited;

creating a traveling course for guiding the unmanned vehicle to travel such that the unmanned vehicle moves in the target movement direction to the target earth unloading position without interfering with the hopper detour area, based on the hopper detour area, the target earth unloading position, and the target movement direction in the target earth unloading position; and guiding the unmanned vehicle to travel along the created traveling course and causing the unmanned vehicle to move in the target movement direction to the target earth unloading position.

3. The guided travel control method for an unmanned vehicle according to claim 1 that is applied to the case in which target earth unloading positions are set in a plurality of different locations around the same hopper pit and a plurality of unmanned vehicles are guided to travel, this method being applied to the case in which the corrected traveling course is created in advance before the guided travel, and comprising:

creating an area of the hopper pit or an area obtained by adding an area in which other unmanned vehicle can be present in other target earth unloading position to the area of the hopper pit, as the hopper detour area in which interference with the unmanned vehicle is prohibited; and creating a corrected traveling course for guiding the unmanned vehicle to travel such that the unmanned vehicle moves in the target movement direction to the corrected target earth unloading position without interfering with the hopper detour area, based on the hopper detour area, the corrected target earth unloading position, and the target movement direction in the target earth unloading position.

4. The guided travel control method for an unmanned vehicle according to claim 2 that is applied to the case in which target earth unloading positions are set in a plurality of different locations around the same hopper pit and a plurality of unmanned vehicles are guided to travel, this method being applied to the case in which the traveling course is created in advance before the guided travel, and comprising:

finding two guard portions that have an opening into which the unmanned vehicle enters, contain inside thereof the area in which the vehicle body interferes with the hopper pit, and protrude outward from an edge of the hopper pit in a direction opposite to the target movement direction based on the target earth unloading position, the target movement direction in the target earth unloading position, data indicating a body width of the unmanned vehicle, and data indicating the area of the hopper pit, and creating an area obtained by subtracting an inner area of the two guards from an area obtained by adding the two guards to the area of the hopper pit, or an area obtained by subtracting the inner area of the two guards from an area obtained by adding an area in which other unmanned vehicle can be present in other target earth unloading position to this area as the hopper detour area in which interference with the unmanned vehicle is prohibited; and creating a traveling course for guiding the unmanned vehicle to travel such that the unmanned vehicle moves in the target movement direction to the target earth unloading position without interfering with the hopper detour area, based on the hopper detour area, the target earth unloading position, and the target movement direction in the target earth unloading position.

5. The guided travel control method for an unmanned vehicle according to claim 1 that is applied to the case in which target earth unloading positions are set in a plurality of different locations around the same hopper pit and a plurality of unmanned vehicles are guided to travel, the method comprising:

determining whether other unmanned vehicle is present in other target earth unloading position or moves toward other target earth unloading position when an unmanned vehicle is guided to travel to the target earth unloading position;

in the case where the other unmanned vehicle is determined to be present in the other target earth unloading position or moves toward the other target earth unloading position when the unmanned vehicle is guided to travel to the target earth unloading position, creating the area of the hopper pit or an area obtained by adding an area in which the other unmanned vehicle can be present in the other target earth unloading position to the area of the hopper pit, as a hopper detour area in which interference with the unmanned vehicle is prohibited; and creating a corrected traveling course for guiding the unmanned vehicle to travel such that the unmanned vehicle moves in the target movement direction to the corrected target earth unloading position without interfering with the hopper detour area, based on the hopper detour area, the corrected target earth unloading position, and the target movement direction in the target earth unloading position.

6. The guided travel control method for an unmanned vehicle according to claim 2 that is applied to the case in which target earth unloading positions are set in a plurality of different locations around the same hopper pit and a plurality of unmanned vehicles are guided to travel, the method comprising:

determining whether other unmanned vehicle is present in other target earth unloading position or moves toward other target earth unloading position when an unmanned vehicle is guided to travel to the target earth unloading position;

in the case where the other unmanned vehicle is determined to be present in the other target earth unloading position or moves toward the other target earth unloading position when the unmanned vehicle is guided to travel to the target earth unloading position, finding two guard portions that have an opening into which the unmanned vehicle enters, contain inside thereof the area in which the vehicle body interferes with the hopper pit, and protrude outward from an edge of the hopper pit in a direction opposite to the target movement direction based on the target earth unloading position, the target movement direction in the target earth unloading position, data indicating a body width of the unmanned vehicle, and data indicating the area of the hopper pit, and creating an area obtained by subtracting an inner area of the two guards from an area obtained by adding the two guards to the area of the hopper pit, or an area obtained by subtracting the inner area of the two guards from an area obtained by adding an area in which the other unmanned vehicle can be present in the other target earth unloading position to this area as a hopper detour area in which interference with the unmanned vehicle is prohibited; and creating a traveling course for guiding the unmanned vehicle to travel such that the unmanned vehicle moves in the target movement direction to the target earth unloading position without interfering with the hopper detour area, based on the hopper detour area, the target earth unloading position, and the target movement direction in the target earth unloading position.

7. A guided travel control apparatus for an unmanned vehicle by which the unmanned vehicle is guided to travel along a traveling course such that the unmanned vehicle moves in a target movement direction to a target earth unloading position of a hopper pit, and the unmanned vehicle is caused to perform an earth unloading operation in a state in which a vehicle body interferes with the hopper pit, comprising:

corrected target earth unloading position computation means for finding a position obtained by shifting the target earth unloading position in a direction of withdrawing from the hopper pit that is a direction opposite to the target movement direction, to a position in which the body of the unmanned vehicle does not interfere with the hopper pit, as a corrected target earth unloading position;

hopper detour area creation means for creating an area of the hopper pit as a hopper detour area in which interference with the unmanned vehicle is prohibited; and corrected traveling course computation means for creating a corrected traveling course for guiding the unmanned vehicle to travel such that the unmanned vehicle moves in the target movement direction to the corrected target earth unloading position without interfering with the hopper detour area, based on the hopper detour area created by the hopper detour area creation means, the corrected target earth unloading position computed by the corrected target earth unloading position computation means, and the target movement direction in the target earth unloading position; wherein the unmanned vehicle is guided to travel by the guided travel control apparatus along the corrected traveling course created by the corrected traveling course computation means;

the unmanned vehicle is caused to move in the target movement direction to the corrected target earth unloading position; and the unmanned vehicle is further guided to travel along a route from the corrected target earth unloading position to the target earth unloading position, and the unmanned vehicle is caused to move in the target movement direction to the target earth unloading position.

8. A guided travel control apparatus for an unmanned vehicle by which the unmanned vehicle is guided to travel along a traveling course such that the unmanned vehicle moves in a target movement direction to a target earth unloading position of a hopper pit, and the unmanned vehicle is caused to perform an earth unloading operation in a state in which a vehicle body interferes with the hopper pit, comprising:

hopper detour area creation means for finding two guard portions that have an opening into which the unmanned vehicle enters, contain inside thereof an area in which the vehicle body interferes with the hopper pit, and protrude outward from an edge of the hopper pit in a direction opposite to the target movement direction based on the target earth unloading position, target movement direction in the target earth unloading position, data indicating a body width of the unmanned vehicle, and data indicating an area of the hopper pit, and creating an area obtained by subtracting an inner area of the two guards from an area obtained by adding the two guards to the area of the hopper pit as a hopper detour area in which interference with the unmanned vehicle is prohibited; and traveling course creation means for creating a traveling course for guiding the unmanned vehicle to travel such that the unmanned vehicle moves in the target movement direction to the target earth unloading position without interfering with the hopper detour area, based on the hopper detour area created by the hopper detour area creation means, the target earth unloading position, and the target movement direction in the target earth unloading position; wherein the unmanned vehicle is guided to travel by the guided travel control apparatus along the traveling course created by the traveling course computation means; and the unmanned vehicle is caused to move in the target movement direction to the target earth unloading position.

9. The guided travel control apparatus for an unmanned vehicle according to claim 7 that is applied to the case in which target earth unloading positions are set in a plurality of different locations around the same hopper pit and a plurality of unmanned vehicles are guided to travel, this apparatus being applied to the case in which the corrected traveling course is created in advance before the guided travel, wherein the hopper detour area creation means creates the area of the hopper pit or an area obtained by adding an area in which other unmanned vehicle can be present in other target earth unloading position to the area of the hopper pit, as the hopper detour area in which interference with the unmanned vehicle is prohibited; and the corrected traveling course computation means creates the corrected traveling course for guiding the unmanned vehicle to travel such that the unmanned vehicle moves in the target movement direction to the corrected target earth unloading position without interfering with the hopper detour area, based on the hopper detour area created by the hopper detour area creation means, the corrected target earth unloading position, and the target movement direction in the target earth unloading position.

10. The guided travel control apparatus for an unmanned vehicle according to claim 8 that is applied to the case in which target earth unloading positions are set in a plurality of different locations around the same hopper pit and a plurality of unmanned vehicles are guided to travel, this apparatus being applied to the case in which the traveling course is created in advance before the guided travel, wherein the hopper detour area creation means finds two guard portions that have an opening into which the unmanned vehicle enters, contain inside thereof the area in which the vehicle body interferes with the hopper pit, and protrude outward from an edge of the hopper pit in a direction opposite to the target movement direction based on the target earth unloading position, the target movement direction in the target earth unloading position, data indicating a body width of the unmanned vehicle, and data indicating the area of the hopper pit, and creates an area obtained by subtracting an inner area of the two guards from an area obtained by adding the two guards to the area of the hopper pit, or an area obtained by subtracting the inner area of the two guards from an area obtained by adding an area in which other unmanned vehicle can be present in other target earth unloading position to this area as a hopper detour area in which interference with the unmanned vehicle is prohibited; and the traveling course creation means creates a traveling course for guiding the unmanned vehicle to travel such that the unmanned vehicle moves in the target movement direction to the target earth unloading position without interfering with the hopper detour area, based on the hopper detour area created by the hopper detour area creation means, the target earth unloading position, and the target movement direction in the target earth unloading position.

11. The guided travel control apparatus for an unmanned vehicle according to claim 7 that is applied to the case in which target earth unloading positions are set in a plurality of different locations around the same hopper pit and a plurality of unmanned vehicles are guided to travel, the apparatus comprising determination means for determining whether other unmanned vehicle is present in other target earth unloading position or moves toward other target earth unloading position when an unmanned vehicle is guided to travel to the target earth unloading position, wherein in the case where the other unmanned vehicle is determined to be present in the other target earth unloading position or move toward the other target earth unloading position when the unmanned vehicle is guided to travel to the target earth unloading position, the hopper detour area creation means creates the area of the hopper pit or an area obtained by adding an area in which the other unmanned vehicle can be present in the other target earth unloading position to the area of the hopper pit, as the hopper detour area in which interference with the unmanned vehicle is prohibited; and the corrected traveling course computation means creates the corrected traveling course for guiding the unmanned vehicle to travel such that the unmanned vehicle moves in the target movement direction to the corrected target earth unloading position without interfering with the hopper detour area, based on the hopper detour area created by the hopper detour area creation means, the corrected target earth unloading position, and the target movement direction in the target earth unloading position.

12. The guided travel control apparatus for an unmanned vehicle according to claim 8 that is applied to the case in which target earth unloading positions are set in a plurality of different locations around the same hopper pit and a plurality of unmanned vehicles are guided to travel, the apparatus comprising determination means for determining whether other unmanned vehicle is present in other target earth unloading position or moves toward other target earth unloading position when an unmanned vehicle is guided to travel to the target earth unloading position, wherein in the case where the other unmanned vehicle is determined to be present in the other target earth unloading position or moves toward the other target earth unloading position when the unmanned vehicle is guided to travel to the target earth unloading position, the hopper detour area creation means finds two guard portions that have an opening into which the unmanned vehicle enters, contain inside thereof the area in which the vehicle body interferes with the hopper pit, and protrude outward from an edge of the hopper pit in a direction opposite to the target movement direction based on the target earth unloading position, the target movement direction in the target earth unloading position, data indicating a body width of the unmanned vehicle, and data indicating the area of the hopper pit, and creates an area obtained by subtracting an inner area of the two guards from an area obtained by adding the two guards to the area of the hopper pit, or an area obtained by subtracting the inner area of the two guards from an area obtained by adding an area in which the other unmanned vehicle can be present in the other target earth unloading position to this area as the hopper detour area in which interference with the unmanned vehicle is prohibited; and the traveling course creation means creates a traveling course for guiding the unmanned vehicle to travel such that the unmanned vehicle moves in the target movement direction to the target earth unloading position without interfering with the hopper detour area, based on the hopper detour area created by the hopper detour area creation means, the target earth unloading position, and the target movement direction in the target earth unloading position.

13. A guided travel control apparatus for an unmanned vehicle in which a control station comprises a communication device and a course generation device;

the unmanned vehicle comprises a control device and a communication device; and data exchange is performed by the communication device of the control station and the communication device of the unmanned vehicle, and the unmanned vehicle is guided to travel, wherein the course generation device of the control station finds a position obtained by shifting a target earth unloading position in a direction of withdrawing from a hopper pit that is the direction opposite to the target movement direction, to a position in which a body of the unmanned vehicle does not interfere with the hopper pit, as a corrected target earth unloading position;

creates an area of the hopper pit as a hopper detour area in which interference with the unmanned vehicle is prohibited; and creates a corrected traveling course for guiding the unmanned vehicle to travel such that the unmanned vehicle moves in the target movement direction to the corrected target earth unloading position without interfering with the hopper detour area, based on the target movement direction in the target earth unloading position; and the communication device of the control station transmits the corrected traveling course to the communication device of the unmanned vehicle;

the control device of the unmanned vehicle guides the unmanned vehicle to travel along the corrected traveling course received by the communication device;

causes the unmanned vehicle to move in the target movement direction to the corrected target earth unloading position; and further guides the unmanned vehicle to travel along a route from the corrected target earth unloading position to the target earth unloading position and causes the unmanned vehicle to move in the target movement direction to the target earth unloading position.

* * * * *